US011428280B2

(12) United States Patent
Matsuura et al.

(10) Patent No.: US 11,428,280 B2
(45) Date of Patent: Aug. 30, 2022

(54) CLUTCH CONTROL DEVICE

(71) Applicant: HONDA MOTOR CO., LTD., Tokyo (JP)

(72) Inventors: Kohei Matsuura, Wako (JP); Junya Ono, Wako (JP); Tatsuya Ryuzaki, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/264,003

(22) PCT Filed: Jun. 7, 2019

(86) PCT No.: PCT/JP2019/022763
§ 371 (c)(1),
(2) Date: Jan. 28, 2021

(87) PCT Pub. No.: WO2020/026591
PCT Pub. Date: Feb. 6, 2020

(65) Prior Publication Data
US 2021/0215209 A1 Jul. 15, 2021

(30) Foreign Application Priority Data

Aug. 1, 2018 (JP) .............................. JP2018-145205

(51) Int. Cl.
*F16D 48/06* (2006.01)
(52) U.S. Cl.
CPC .. *F16D 48/066* (2013.01); *F16D 2500/10412* (2013.01); *F16D 2500/1117* (2013.01);
(Continued)

(58) Field of Classification Search
CPC .............................................. F16D 2500/3142
See application file for complete search history.

(56) References Cited

U.S. PATENT DOCUMENTS

| 2012/0298466 A1 | 11/2012 | Nedachi et al. |
| 2013/0269644 A1 | 10/2013 | Arai et al. |
| 2014/0324307 A1 | 10/2014 | Akebono |

FOREIGN PATENT DOCUMENTS

| DE | 102012019895 | 4/2014 |
| DE | 102013111071 | 4/2014 |

(Continued)

OTHER PUBLICATIONS

Extended European Search Report for European Patent Application No. 19843660.2 dated Aug. 19, 2021.

(Continued)

*Primary Examiner* — Timothy Hannon
(74) *Attorney, Agent, or Firm* — Amin, Turocy & Watson, LLP

(57) ABSTRACT

This clutch control device includes an engine (13), a transmission (21), a clutch device (26) configured to connect and disconnect motive power transmission between the engine (13) and the transmission (21), a clutch actuator (50) configured to drive the clutch device (26) and change a clutch capacity, a clutch operating element (4b) configured to enable the clutch device (26) to be manually operated, and a control unit (60) configured to calculate a target value (Pt) of a control parameter (Ps) of the clutch capacity in accordance with an amount of operation on the clutch operating element (4b). When the clutch device (26) is operated on a connection side according to an operation on the clutch operating element (4b), the control unit (60) is configured to set the target value (Pt) to a quick connection target value (Pmax) obtained by making a change to the connection side of the clutch device (26) with respect to an operation correspondence target value (Pv) according to the amount of operation on the clutch operating element (4b) if a speed of (Continued)

the operation on the clutch operating element (4b) is higher than or equal to a predetermined specified speed (Sp1).

6 Claims, 14 Drawing Sheets

(52) U.S. Cl.
CPC ............... *F16D 2500/3067* (2013.01); *F16D 2500/3142* (2013.01); *F16D 2500/3166* (2013.01); *F16D 2500/70406* (2013.01)

(56) References Cited

FOREIGN PATENT DOCUMENTS

| | | |
|---|---|---|
| DE | 102016000544 | 8/2016 |
| GB | 2506674 | 4/2014 |
| JP | 2001-032863 | 2/2001 |
| JP | 2012-072914 | 4/2012 |
| JP | 2014-070686 | 4/2014 |
| JP | 2016-141217 | 8/2016 |
| JP | 2017-198232 | 11/2017 |
| JP | 2019-027516 | 2/2019 |
| WO | 2011/096540 | 8/2011 |
| WO | 2012/090569 | 7/2012 |
| WO | 2013/073307 | 5/2013 |

OTHER PUBLICATIONS

International Search Report and Written Opinion for International Application No. PCT/JP2019/022763 dated Sep. 3, 2019, 7 pages.
Japanese Office Action for Japanese Patent Application No. 2020-534084 dated Oct. 5, 2021.

US 11,428,280 B2

CLUTCH CONTROL DEVICE

TECHNICAL FIELD

The present invention relates to a clutch control device.

The present application claims priority based on Japanese Patent Application No. 2018-145205 filed on Aug. 1, 2018, the contents of which are incorporated herein by reference.

BACKGROUND ART

In recent saddle-riding type vehicles, an automated clutch system for automatically performing connection and disconnection operations of a clutch device according to electrical control has been proposed. In this system, the application of a standby hydraulic pressure for performing ineffective stroke elimination at the time of the disconnection of a clutch to a hydraulically operated clutch device so that the vehicle quickly starts running is conceivable.

Technology for eliminating an ineffective stroke of the starting clutch in a short time by switching a hydraulic pressure command value to an ineffective stroke eliminating pressure higher than a creeping pressure when a hydraulic pressure of a hydraulic circuit rises has been disclosed (for example, see Patent Document 1).

RELATED ART DOCUMENT

Patent Document

Patent Document 1: Japanese Unexamined Patent Application, First Publication No. 2001-032863

SUMMARY

Problems to be Solved by the Invention

Incidentally, the friction of each part when a clutch device is operated affects the responsiveness not only when a system is activated but also when the clutch device is operated. In particular, in an automated clutch system, when a manual operation on a clutch lever is possible, the operational responsiveness of the clutch device becomes an important issue. Also, when the system is adopted in a race vehicle, high operational responsiveness is required when the vehicle starts (when a clutch is connected).

An objective of the present invention is to improve operational responsiveness at the time of a clutch connection in a clutch control device that enables automated clutch control and a manual operation.

Means for Solving the Problem

As the solution to the above-described problems, aspects of the present invention have the following configurations.

(1) A clutch control device according to an aspect of the present invention, includes: an engine; a transmission; a clutch device configured to connect and disconnect motive power transmission between the engine and the transmission; a clutch actuator configured to drive the clutch device and change a clutch capacity; a clutch operating element configured to enable the clutch device to be manually operated; and a control unit configured to calculate a target value of a control parameter of the clutch capacity in accordance with an amount of operation on the clutch operating element, wherein, when the clutch device is operated on a connection side according to an operation on the clutch operating element, the control unit is configured to set the target value to a quick connection target value obtained by making a change to the connection side of the clutch device with respect to an operation correspondence target value according to the amount of operation on the clutch operating element if a speed of the operation on the clutch operating element is higher than or equal to a predetermined specified speed.

(2) In the clutch control device according to the above-described (1), a quick clutch connection mode in which the target value is set to the quick connection target value may continue for a predetermined specified time period.

(3) In the clutch control device according to the above-described (2), the specified time period may change with the speed of the operation on the clutch operating element.

(4) In the clutch control device according to the above-described (2) or (3), the quick clutch connection mode may be released when the specified time period has elapsed.

(5) In the clutch control device according to any one of the above-described (1) to (4), when a rotational speed of the engine is higher than or equal to a predetermined specified rotational speed, the target value may be set to the quick connection target value.

(6) In the clutch control device according to any one of the above-described (1) to (5), the quick connection target value may be the target value when the clutch actuator is driven at an upper limit.

Advantage of the Invention

According to the clutch control device described in the above-described (1) of the present invention, when the speed of the operation on the clutch operating element is higher than or equal to a predetermined speed, a time period required for the connection preparation (ineffective stroke elimination) of the clutch device is limited by changing the control target value of the clutch capacity to the clutch connection side and making a shift to a quick clutch connection mode using a control target value regardless of the amount of operation on the clutch operating element. Thereby, the operability at the time of a quick connection of the clutch device such as the time of the start of racing can be improved.

According to the clutch control device described in the above-described (2) of the present invention, it is possible to reliably perform the connection preparation (the ineffective stroke elimination) of the clutch device by causing the quick clutch connection mode in which the control target value of the clutch capacity is changed to the clutch connection side to be continued for a specified time period or longer.

According to the clutch control device described in the above-described (3) of the present invention, a continuation time period of the quick clutch connection mode is increased or decreased in accordance with the speed of the operation on the clutch operating element, so that it is possible to adjust timings of the start and release of the quick clutch connection mode in accordance with the speed of the operation on the clutch operating element.

According to the clutch control device described in the above-described (4) of the present invention, after the control target value of the clutch capacity is changed with the quick connection target value, it is possible to operate the clutch in consideration of the intention of a rider by returning to the normal control according to the amount of operation on the clutch operating element.

According to the clutch control device described in the above-described (5) of the present invention, it is possible to reliably increase the control target value at the time of a quick clutch connection by predicting the rider's intention of the quick clutch connection using the engine rotational speed.

According to the clutch control device described in the above-described (6) of the present invention, it is possible to improve the responsiveness of the clutch as much as possible by increasing the quick connection target value at a maximum value in the performance of the clutch actuator.

DESCRIPTION OF THE EMBODIMENTS

Hereinafter, embodiments of the present invention will be described with reference to the drawings. Also, in the following description, forward, rearward, left, and right directions and the like are the same as those in a vehicle to be described below unless otherwise mentioned. Also, an arrow FR indicating a forward direction with respect to the vehicle, an arrow LH indicating a left direction with respect to the vehicle, and an arrow UP indicating an upward direction with respect to the vehicle are shown in appropriate places in drawings used in the following description.

<Whole Vehicle>

Figure 1:
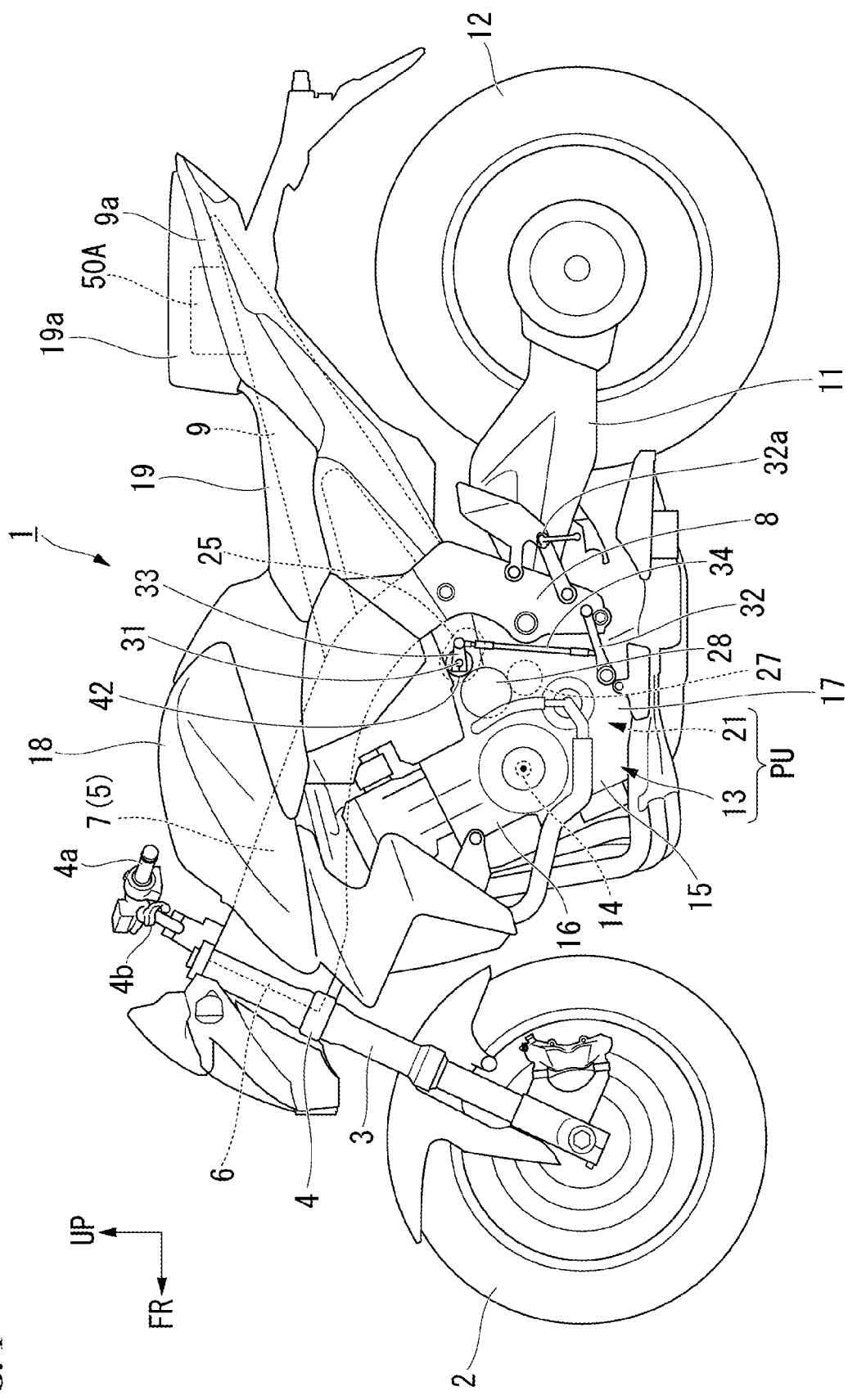
FIG. 1 is a left side view of a motorcycle according to an embodiment of the present invention.

As illustrated in FIG. 1, the present embodiment is applied to a motorcycle 1 that is an example of a saddle riding-type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 via a steering stem 4. A bar-type steering handle 4a is mounted on a top bridge of the steering stem 4.

The vehicle body frame 5 includes the head pipe 6, main tubes 7 that extend downward and rearward from the head pipe 6 at the center in a vehicle width direction (a left/right direction), left and right pivot frames 8 connected in the downward direction of a rear end of the main tubes 7 and a seat frame 9 connected in the rearward direction of the main tubes 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

In the upward direction of the left and right main tubes 7, a fuel tank 18 is supported. In the upward direction of the seat frame 9 in the rearward direction of the fuel tank 18, a front seat 19 and a rear seat cover 19a are aligned in front of and behind each other and supported. The periphery of the seat frame 9 is covered with a rear cowl 9a. In the downward direction of the left and right main tubes 7, a power unit PU that is a motor of the motorcycle 1 is suspended. The power unit PU is linked with the rear wheel 12, for example, via a chain-type transmission mechanism.

The power unit PU integrally includes an engine (an internal combustion engine and a motor) 13 positioned on a front side of the power unit PU and a transmission 21 positioned on a rear side of the power unit PU. The engine 13, for example, is a multiple cylinder engine in which a rotary shaft of a crank shaft 14 is aligned in the left/right direction (the vehicle width direction). The engine 13 raises a cylinder 16 above a front part of a crank case 15. A rear part of the crank case 15 is formed as a transmission case 17 that accommodates the transmission 21.

<Transmission>

Figure 2:
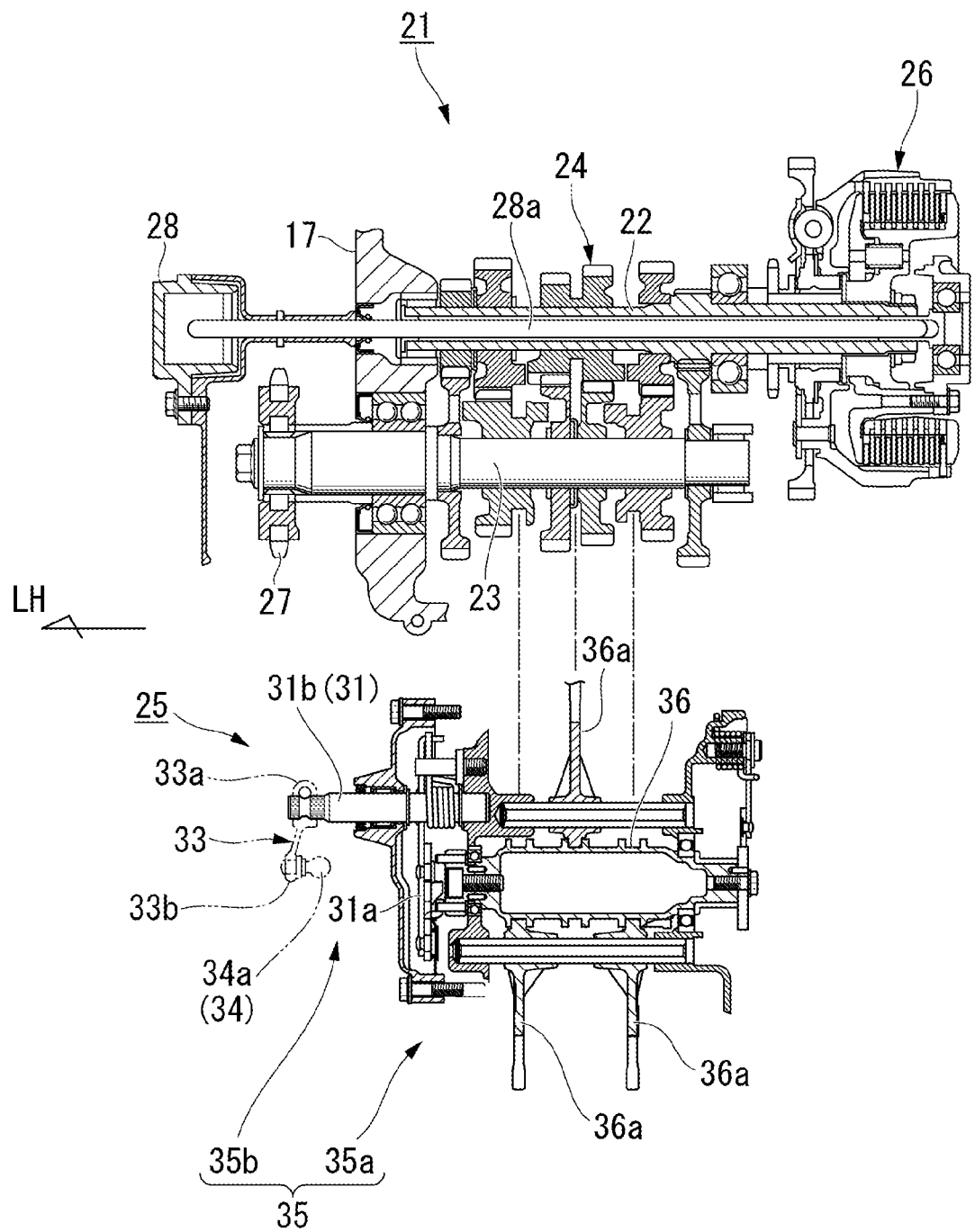
FIG. 2 is a cross-sectional view of a transmission and a change mechanism of the above-described motorcycle.

As illustrated in FIG. 2, the transmission 21 is a stepped transmission including a main shaft 22, a counter shaft 23, and a transmission gear group 24 disposed across both shafts 22 and 23. The counter shaft 23 constitutes an output shaft of the transmission 21 and the power unit PU. An end of the counter shaft 23 protrudes to the left side of a rear part of the crank case 15 and is connected to the rear wheel 12 via the chain-type transmission mechanism.

The transmission gear group 24 includes gears corresponding to the number of shift stages supported at both shafts 22 and 23. The transmission 21 is of a constant engagement type in which a pair of corresponding gears of the transmission gear group 24 are constantly engaged with each other between the shafts 22 and 23. A plurality of gears supported at both shafts 22 and 23 can be classified into a free gear that can rotate with respect to a corresponding shaft and a slide gear (a shifter) that is spline-fitted to a corresponding shaft. One of the free gear and the slide gear has a convex dog provided in an axial direction and the other has a concave slot provided in the axial direction so that the slot is engaged with the dog. That is, the transmission 21 is a so-called dog mission.

The main shaft 22 and the counter shaft 23 of the transmission 21 are disposed to be aligned in front of and behind each other in the rearward direction of the crank shaft 14. A clutch device 26 operated by a clutch actuator 50 (see FIG. 3) is coaxially disposed at a right end of the main shaft 22. The clutch device 26, for example, is a wet multiplate clutch and is a so-called normal open clutch. That is, the clutch device 26 reaches a connected state in which motive power transmission is enabled in accordance with the supply of a hydraulic pressure from the clutch actuator 50 and is returned to a disconnected state in which motive power transmission is disabled when there is no supply of the hydraulic pressure from the clutch actuator 50.

Rotation power of the crank shaft 14 is transmitted to the main shaft 22 via the clutch device 26 and is transmitted from the main shaft 22 to the counter shaft 23 via any gear pair of the transmission gear group 24. A drive sprocket 27 of the above-described chain-type transmission mechanism is attached to a left end of the counter shaft 23 that protrudes to the left side of a rear part of the crank case 15.

In the rearward and downward directions of the transmission 21, a change mechanism 25, which performs switching between gear pairs of the transmission gear group 24, is accommodated. The change mechanism 25 operates a plurality of shift forks 36a in accordance with the pattern of a lead groove formed on the outer periphery thereof in accordance with rotation of a shift drum 36 having a hollow cylindrical shape parallel to both shafts 22 and 23 and performs switching of a gear pair for use in motive power transmission between the shafts 22 and 23 in the transmission gear group 24.

The change mechanism 25 includes a shift spindle 31 parallel to the shift drum 36. At the time of rotation of the shift spindle 31, a shift arm 31a fixed to the shift spindle 31 rotates the shift drum 36, rotates the shift fork 36a in the axial direction in accordance with the pattern of the lead groove, and switches a gear pair in which motive power transmission is enabled within the transmission gear group 24 (i.e., switches a shift stage).

Referring also to FIG. 1, the shift spindle 31 causes a shaft outer part 31b to protrude to an outward side (in the left direction) of the crank case 15 in the vehicle width direction such that the change mechanism 25 is operable. A shift load sensor 42 (a shift operation detecting means) is coaxially attached to the shaft outer part 31b of the shift spindle 31. A swing lever 33 is attached to the shaft outer part 31b (or a rotation shaft of the shift load sensor 42) of the shift spindle 31. The swing lever 33 extends rearward from a base end part 33a that is fixed to the shift spindle 31 (or the rotation shaft) through clamp fixing and an upper end of a link load 34 is connected to a tip end part 33b thereof via an upper ball joint 34a so that it is freely swingable. A lower end of the link load 34 is connected to a shift pedal 32 that is operated by a driver using a foot via a lower ball joint (not illustrated) so that it is freely swingable.

As illustrated in FIG. 1, the shift pedal 32 has a front end supported at a lower part of the crank case 15 so that the shift pedal 32 is vertically swingable via a shaft in a left/right direction. A pedal part for hooking the driver's tiptoe placed on a step 32a is provided at a rear end of the shift pedal 32 and a lower end of the link load 34 is connected to a middle part in a front/back direction of the shift pedal 32.

As illustrated in FIG. 2, a shift change device 35, which includes the shift pedal 32, the link load 34, and the change mechanism 25 and performs gear switching of a gar shift step of the transmission 21, is configured. In the shift change device 35, an assembly (the shift drum 36, the shift forks 36a, and the like), which switches a shift stage of the transmission 21 inside the transmission case 17, will be referred to as a shift operating unit 35a and an assembly (the shift spindle 31, the shift arm 31a, and the like) that rotates around the shift spindle 31 when a shift operation for the shift pedal 32 is input and transmits this rotation to the shift operating unit 35a will be referred to as a shift operation receiving unit 35b.

Here, the motorcycle 1 employs a so-called semi-automated transmission system (an automated clutch-type transmission system) in which only a shift operation of the transmission 21 (a foot operation of the shift pedal 32) is performed by the driver and connection and disconnection operations of the clutch device 26 are automatically performed by electrical control in accordance with an operation of the shift pedal 32.

<Transmission System>

Figure 4:
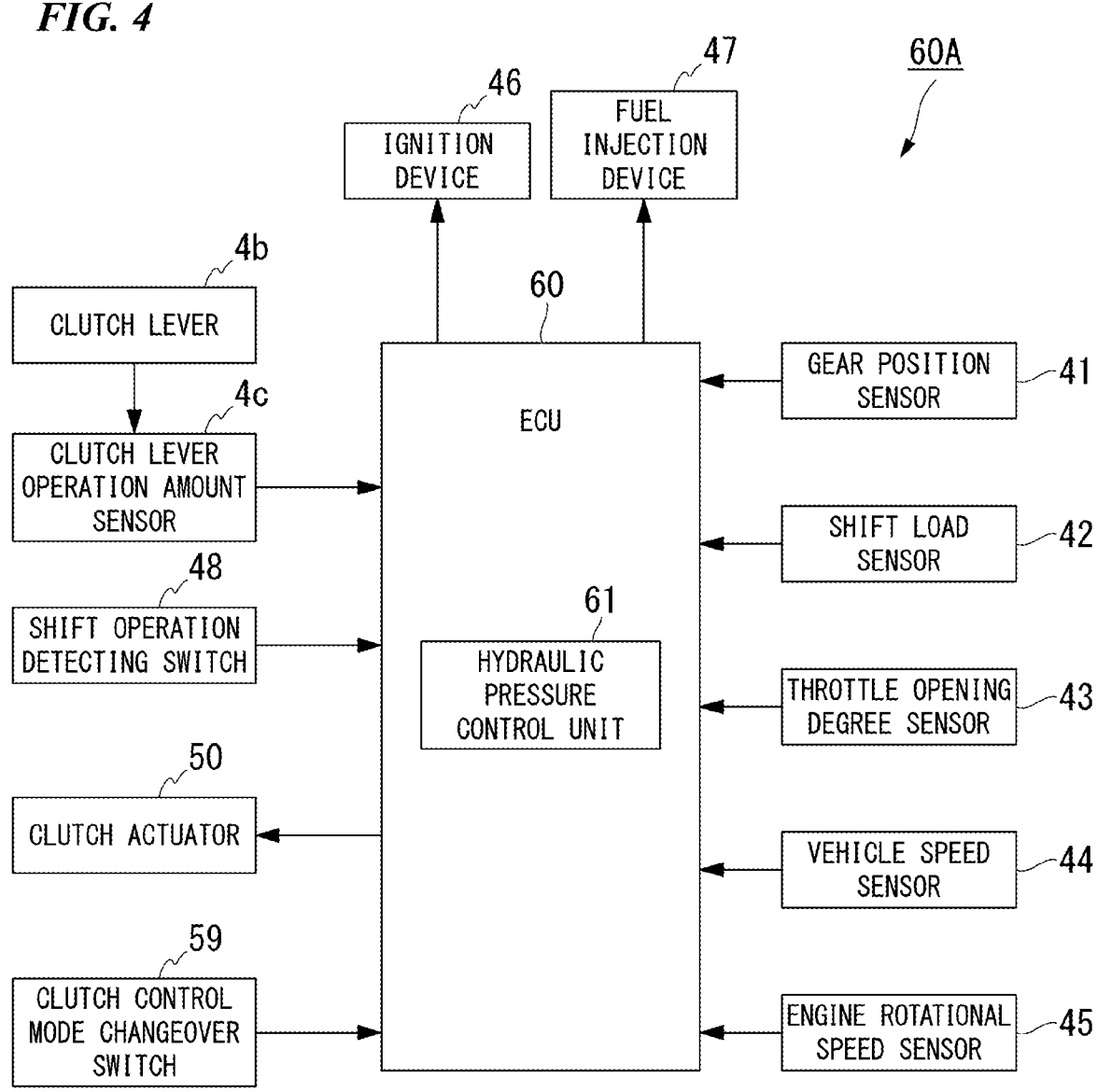
FIG. 4 is a block diagram of a transmission system.

As illustrated in FIG. 4, the above-described transmission system includes a clutch actuator 50, an electronic control unit (ECU) (control unit) 60, and various types of sensors 41 to 45.

The ECU 60 controls the operation of the clutch actuator 50 on the basis of detection information from a gear position sensor 41 that detects a shift stage from a rotation angle of the shift drum 36 and a shift load sensor (for example, a torque sensor) 42 that detects an operation torque input to the shift spindle 31, various types of vehicle state detection information from a throttle opening degree sensor 43, a vehicle speed sensor 44, and an engine rotational speed sensor 45, and the like and controls operations of an ignition device 46 and a fuel injection device 47.

Detection information from hydraulic pressure sensors 57 and 58 and a shift operation detecting switch (a shift neutral switch) 48 to be described below is also input to the ECU 60.

Also, the ECU 60 includes a hydraulic pressure control unit (a clutch control unit) 61 and a function thereof will be described below. In FIG. 4, a reference sign 60A denotes the clutch control device of the present embodiment.

Figure 3:
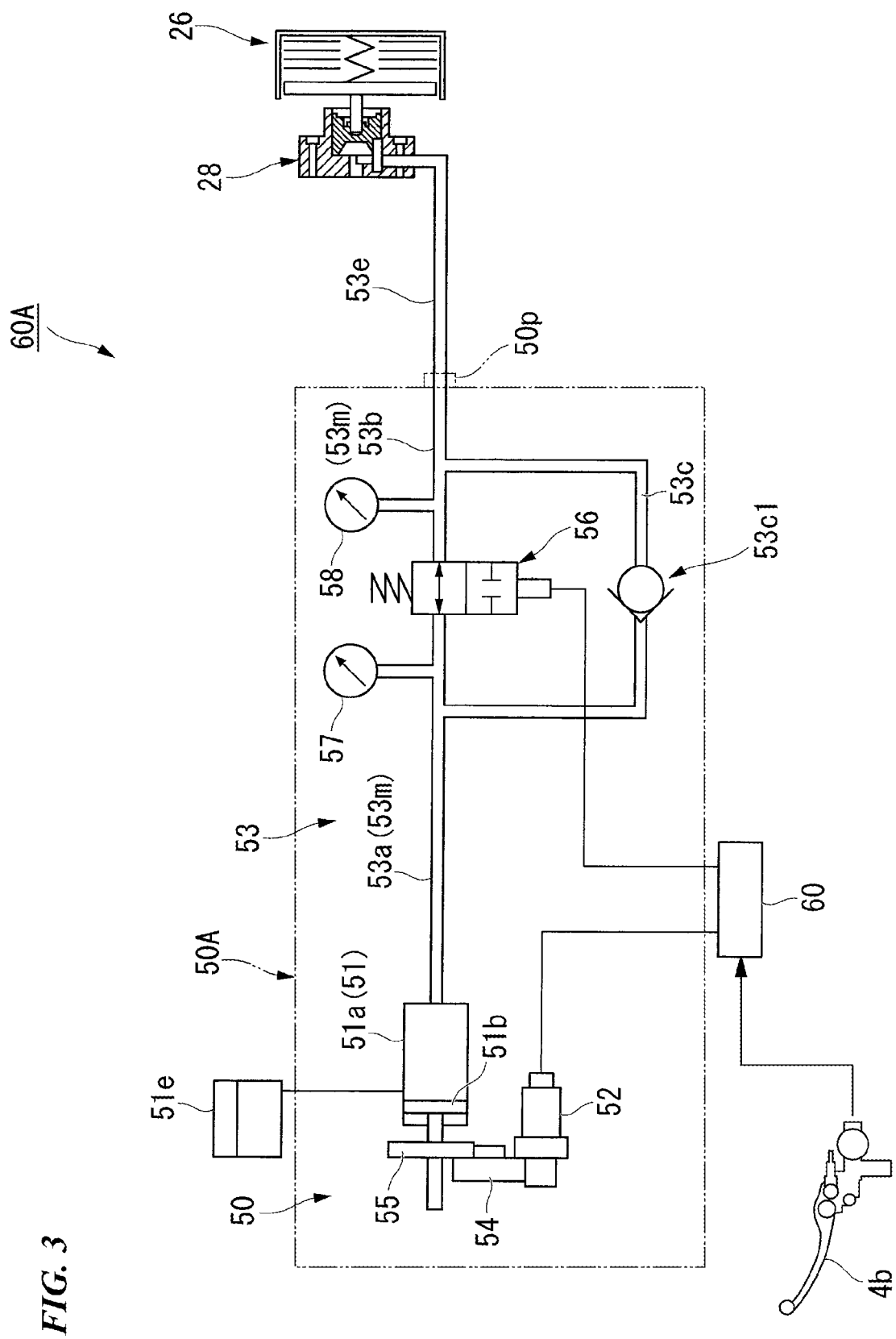
FIG. 3 is a schematic explanatory view of a clutch operating system including a clutch actuator.

Referring also to FIG. 3, the clutch actuator 50 can control a liquid pressure for connecting and disconnecting the clutch device 26 according to operation control by the ECU 60. The clutch actuator 50 includes an electric motor 52 (hereinafter simply referred to as a motor 52) serving as a drive source and a master cylinder 51 driven by the motor 52. The clutch actuator 50 constitutes an integrated clutch control unit 50A together with the hydraulic circuit device 53 provided between the master cylinder 51 and a hydraulic pressure supply-discharge port 50p.

The ECU 60 calculates a target value of a hydraulic pressure (a target hydraulic pressure) supplied to a slave cylinder 28 for connecting and disconnecting the clutch device 26 on the basis of a preset calculation program and controls the clutch control unit 50A such that a hydraulic pressure (a slave hydraulic pressure) of the slave cylinder 28 side detected by the downstream-side hydraulic pressure sensor 58 is close to the target hydraulic pressure.

The master cylinder 51 causes a piston 51b inside a cylinder main body 51a to perform a stroke in accordance with driving of the motor 52 and enables operating oil inside the cylinder main body 51a to be supplied and discharged with respect to the slave cylinder 28. In FIG. 3, a reference sign 55 denotes a conversion mechanism serving as a ball screw mechanism, a reference sign 54 denotes a transmission mechanism disposed across the motor 52 and the conversion mechanism 55, and a reference sign 51e denotes a reservoir connected to the master cylinder 51.

The hydraulic circuit device 53 includes a valve mechanism (a solenoid valve 56) for opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic circuit device 53 can be divided into an upstream-side oil path 53a that is on the master cylinder 51 side from the solenoid valve 56 and a downstream-side oil path 53b that is on the slave cylinder 28 side from the solenoid valve 56. The hydraulic circuit device 53 further includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 for causing operating oil to flow in only one way from the upstream side to the downstream side is provided on the bypass oil path 53c. On the upstream side of the solenoid valve 56, an upstream-side hydraulic pressure sensor 57 for detecting a hydraulic pressure of the upstream-side oil path 53a is provided. On the downstream side of the solenoid valve 56, the downstream-side hydraulic pressure sensor 58 for detecting a hydraulic pressure of the downstream-side oil path 53b is provided.

As illustrated in FIG. 1, for example, the clutch control unit 50A is accommodated in the rear cowl 9a. The slave cylinder 28 is attached to the left side of the rear part of the crank case 15. The clutch control unit 50A and the slave cylinder 28 are connected via a hydraulic piping 53e (see FIG. 3).

As illustrated in FIG. 2, the slave cylinder 28 is coaxially disposed in the left direction of the main shaft 22. When a hydraulic pressure is supplied from the clutch actuator 50, the slave cylinder 28 presses a push load 28a passing through the inside of the main shaft 22 in the right direction. By pressing the push load 28a in the right direction, the slave cylinder 28 causes the clutch device 26 to operate in a connected state via the push load 28a. When there is no supply of the hydraulic pressure, the slave cylinder 28 releases the pressing of the push load 28a and returns the clutch device 26 to a disconnected state.

In order to maintain the clutch device 26 in the connected state, it is necessary to continue the supply of the hydraulic pressure and electric power is consumed to that extent. Therefore, as illustrated in FIG. 3, the solenoid valve 56 is provided in the hydraulic circuit device 53 of the clutch control unit 50A and the solenoid valve 56 is closed after the supply of the hydraulic pressure to the clutch device 26 side. Thereby, the hydraulic pressure supplied to the clutch device 26 side is maintained and a hydraulic pressure corresponding to a decrease in the pressure is configured to be supplemented (recharged by an amount corresponding to a leak), so that the energy consumption is inhibited.

<Clutch Control>

Figure 5:
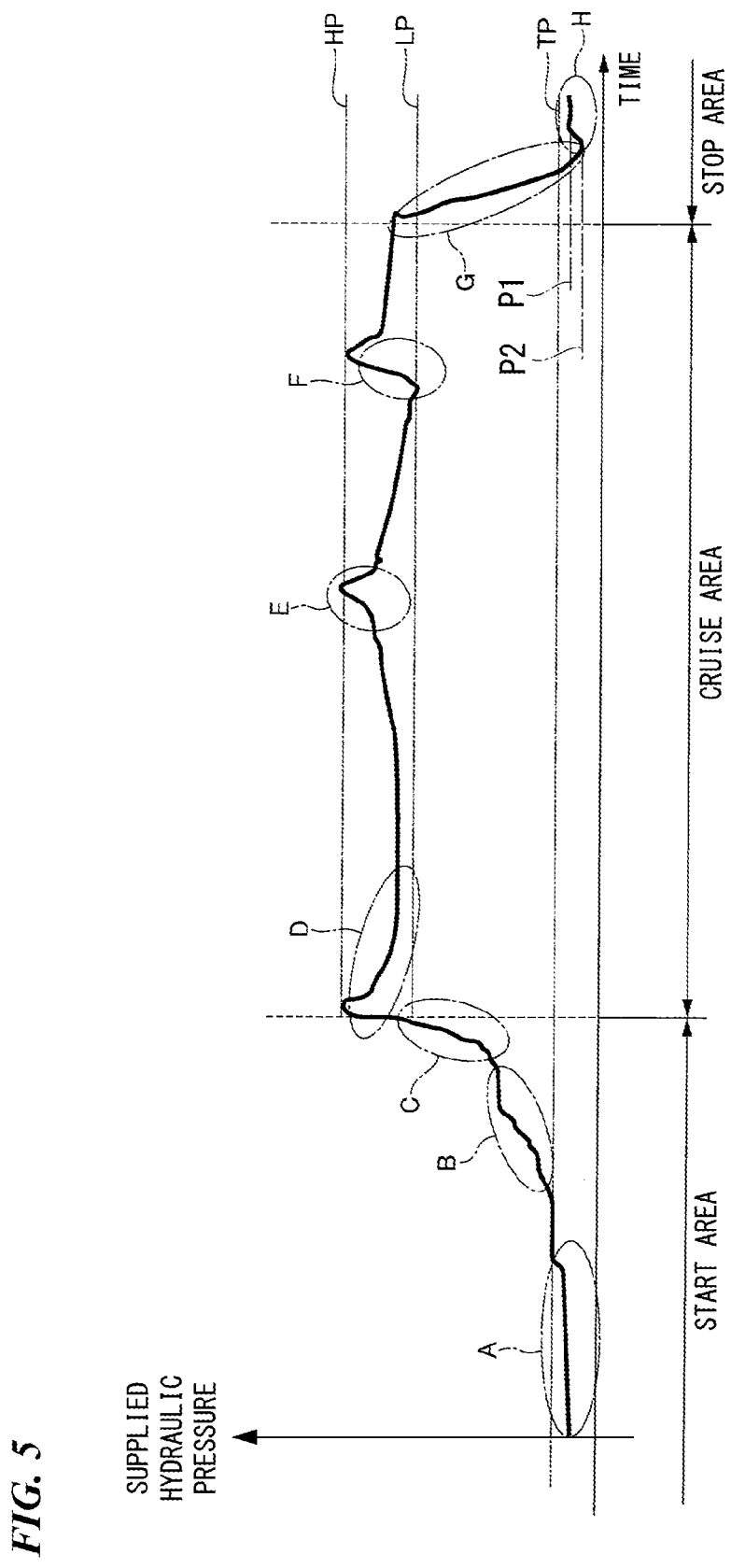
FIG. 5 is a graph illustrating a change in a supplied hydraulic pressure of the clutch actuator.

Next, an action of the clutch control system will be described with reference to a graph of FIG. 5. In the graph of FIG. 5, the vertical axis represents a supplied hydraulic pressure detected by the downstream-side hydraulic pressure sensor 58 and the horizontal axis represents elapsed time.

At the time of stopping (idling) of the motorcycle 1, both the motor 52 and the solenoid valve 56 controlled by the ECU (control unit) 60 are in a state in which the supply of electric power has been blocked. That is, the motor 52 is in a stop state and the solenoid valve 56 is in a valve open state. At this time, the slave cylinder 28 side (the downstream side) is in a low-pressure state having a pressure lower than a touch point hydraulic pressure TP and the clutch device 26 is in a non-fastened state (a disconnected state or a released state). This state corresponds to an area A of FIG. 5.

When the motorcycle 1 is started, electric power is supplied only to the motor 52, and a hydraulic pressure is supplied from the master cylinder 51 to the slave cylinder 28 through the solenoid valve 56 of the valve open state if the rotational speed of the engine 13 is increased. When the hydraulic pressure of the slave cylinder 28 side (the downstream side) is increased to the touch point hydraulic pressure TP or higher, the fastening of the clutch device 26 is started and the clutch device 26 enters a half-clutch state in which partial motive power can be transmitted. Thereby, the motorcycle 1 can be smoothly started. This state corresponds to an area B of FIG. 5.

Thereafter, when a difference between input rotation and output rotation of the clutch device 26 decreases and the hydraulic pressure of the slave cylinder 28 side (the downstream side) reaches a lower limit retaining hydraulic pressure LP, the fastening of the clutch device 26 transitions to a locked state and all the driving force of the engine 13 is transmitted to the transmission 21. This state corresponds to an area C of FIG. 5. The areas A to C form a start area.

When a hydraulic pressure is supplied from the master cylinder 51 side to the slave cylinder 28 side, the solenoid valve 56 is in the valve open state, the motor 52 is driven to rotate in a normal direction according to the application of an electric current to the motor 52, and the master cylinder 51 is pressed. Thereby, the hydraulic pressure of the slave cylinder 28 side is adjusted to a clutch fastening hydraulic pressure. At this time, the driving of the clutch actuator 50 is subjected to feedback control on the basis of a hydraulic pressure detected by the downstream-side hydraulic pressure sensor 58.

When the hydraulic pressure of the slave cylinder 28 side (the downstream side) reaches an upper limit retaining hydraulic pressure HP, electric power is supplied to the solenoid valve 56, the solenoid valve 56 performs a valve closing operation, the supply of electric power to the motor 52 is stopped, and the generation of the hydraulic pressure is stopped. That is, the upstream side enters a low pressure state in accordance with the release of the hydraulic pressure, whereas the downstream side is maintained in the high pressure state (the upper limit retaining hydraulic pressure HP). Thereby, without the master cylinder 51 generating a hydraulic pressure, the clutch device 26 is maintained in the fastened state, and the power consumption can be inhibited while running of the motorcycle 1 is enabled.

Here, a shift may also be performed immediately after a hydraulic pressure is filled in the clutch device 26 according to a shift operation. In this case, before the solenoid valve 56 performs a valve closing operation and causes the upstream side to enter a low pressure state, the motor 52 is reversely driven in a valve open state of the solenoid valve 56 and depressurizes the master cylinder 51 and communicates with the reservoir 51e to relieve hydraulic pressure of the clutch device 26 side to the master cylinder 51 side. At this time, the driving of the clutch actuator 50 is subjected to feedback control on the basis of a hydraulic pressure detected by the upstream-side hydraulic pressure sensor 57.

Even if the solenoid valve 56 is closed and the clutch device 26 is maintained in the fastened state, the hydraulic pressure of the downstream side gradually decreases (leaks) as in an area D of FIG. 5. That is, the hydraulic pressure of the downstream side gradually decreases due to primary causes such as a leakage of the hydraulic pressure and a temperature decrease according to deformation and the like of seals of the solenoid valve 56 and the one-way valve 53c1.

On the other hand, as in the area E of FIG. 5, a hydraulic pressure of the downstream side may also be increased due to an increase in the temperature or the like. Because any small change in the hydraulic pressure of the downstream side can be absorbed by an accumulator (not illustrated) and the motor 52 and the solenoid valve 56 are operated every time the hydraulic pressure changes, power consumption is not increased.

As in an area E of FIG. 5, when a hydraulic pressure of the downstream side has increased to the upper limit retaining hydraulic pressure HP, the solenoid valve 56 is set in a valve open state in a stepwise manner due to a decrease in the supply of electric power to the solenoid valve 56 or the like and the hydraulic pressure of the downstream side is relieved toward the upstream side.

As in an area F of FIG. 5, when the hydraulic pressure of the downstream side has decreased to the lower limit retaining hydraulic pressure LP, the supply of electric power to the motor 52 is started in a state in which the solenoid valve 56 has been closed and the hydraulic pressure of the upstream side is increased. When the hydraulic pressure of the upstream side is higher than the hydraulic pressure of the downstream side, this hydraulic pressure is supplied (recharged) to the downstream side via the bypass oil path 53c and the one-way valve 53c1. When the hydraulic pressure of the downstream side becomes the upper limit retaining hydraulic pressure HP, the supply of electric power to the motor 52 is stopped and the generation of the hydraulic pressure is stopped. Thereby, the hydraulic pressure of the downstream side is maintained between the upper limit retaining hydraulic pressure HP and the lower limit retaining hydraulic pressure LP and the clutch device 26 is maintained in the fastened state. The areas D to F are set as a cruise area.

If the transmission 21 becomes neutral when the motorcycle 1 is stopped, the supply of electric power to the motor 52 and the solenoid valve 56 is stopped together. Thereby, the master cylinder 51 stops the generation of a hydraulic pressure and stops the supply of a hydraulic pressure to the slave cylinder 28. The solenoid valve 56 is in a valve open state and the hydraulic pressure within the downstream-side oil path 53b is returned to the reservoir 51e. According to the above, the slave cylinder 28 side (the downstream side) is in a low pressure state with a hydraulic pressure lower than the touch point hydraulic pressure TP and the clutch device 26 is in a non-fastened state. This state corresponds to areas G and H of FIG. 5. The areas G and H are set as a stop area. On the other hand, if the transmission 21 remains in an in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP at which the connection of the clutch device 26 starts and is a hydraulic pressure (a hydraulic pressure applied to the areas A and H of FIG. 5) at which the clutch device 26 is not connected. In accordance with the application of the standby hydraulic pressure WP, ineffective stroke elimination for the clutch device 26 (the cancellation of a backlash or operating reaction force of each part, the application of a preload to a hydraulic path, or the like) can be performed and operation responsiveness at the time of the connection of the clutch device 26 is improved.

<Shift Control>

Next, shift control of the motorcycle 1 will be described.

In an in-gear stop state in which a gear position of the transmission 21 is in an in-gear state of the first speed and a vehicle speed is lower than a setting value corresponding to stopping, the motorcycle 1 according to the present embodiment performs control for decreasing the standby hydraulic pressure WP supplied to the slave cylinder 28 when a shift operation on the shift pedal 32 from the first speed to neutral is performed.

Here, when the motorcycle 1 is in the stop state and the gear position of the transmission 21 is any shift stage position other than neutral, i.e., when the transmission 21 is in the in-gear stop state, the standby hydraulic pressure WP that has been preset is supplied to the slave cylinder 28.

The standby hydraulic pressure WP is set to a first setting value P1 (see FIG. 5) that is a standard standby hydraulic pressure at normal times (in the case of a non-detected state in which a shift operation of the shift pedal 32 is not detected). Thereby, the clutch device 26 is in a standby state in which the ineffective stroke elimination has been performed and the responsiveness at the time of clutch fastening is improved. That is, when the rotational speed of the engine 13 is increased by the driver increasing the degree of throttle opening, the fastening of the clutch device 26 is immediately started in accordance with the supply of a hydraulic pressure to the slave cylinder 28 and quick start and acceleration of the motorcycle 1 can be performed.

The motorcycle 1 includes a shift operation detecting switch 48 in addition to the shift load sensor 42 so that the driver's shift operation on the shift pedal 32 is detected. For example, the shift operation detecting switch 48 is disposed opposite to the tip end of the shift arm 31a and detects a slight rotation of the shift spindle 31 by the shift operation of the shift pedal 32 with high sensitivity.

In the in-gear stop state, when the shift operation detecting switch 48 detects a shift operation from the first speed to neutral, the hydraulic pressure control unit 61 performs control for setting the standby hydraulic pressure WP to a second setting value P2 (a low standby hydraulic pressure; see FIG. 5) lower than the first setting value P1 before the shift operation.

When the transmission 21 is in the in-gear state, the standard standby hydraulic pressure corresponding to the first setting value P1 is supplied to the slave cylinder 28 at normal times, so that so-called dragging is slightly generated in the clutch device 26. At this time, a dog and a slot (a dog hole) engaged with each other in the dog clutch of the transmission 21 may press each other in the rotation direction and cause resistance to disengagement and the shift operation may become heavy. In this case, if the standby hydraulic pressure WP supplied to the slave cylinder 28 is decreased to a low standby hydraulic pressure corresponding to the second setting value P2, the engagement between the dog and the slot can be easily released and the shift operation becomes light.

<Clutch Control Mode>

Figure 7:
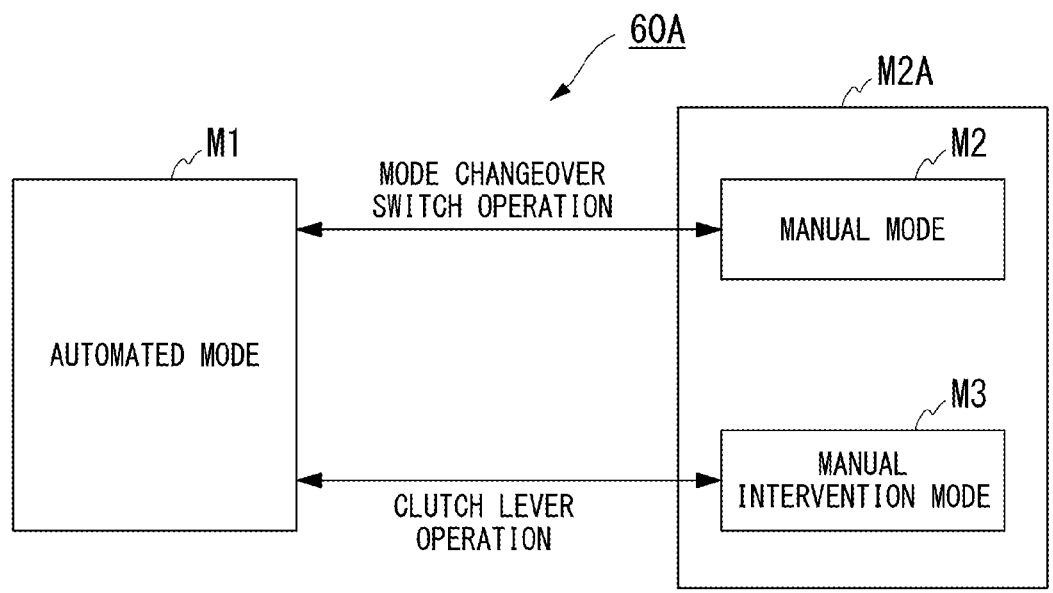
FIG. 7 is an explanatory diagram illustrating the transition of a clutch control mode according to the embodiment of the present invention.

As illustrated in FIG. 7, a clutch control device 60A according to the present embodiment has three types of clutch control modes. The clutch control mode appropriately transitions between three types of modes including an automated mode M1 in which automated control is performed, a manual mode M2 in which a manual operation is performed, and a manual intervention mode M3 in which a temporary manual operation is performed in accordance with operations of a clutch control mode changeover switch 59 (see FIG. 4) and a clutch lever (a clutch operating element) 4b (see FIG. 1). Also, targets including the manual mode M2 and the manual intervention mode M3 will be referred to as a manual system M2A.

The automated mode M1 is a mode in which the clutch device 26 is controlled by calculating a clutch capacity suitable for a traveling state in accordance with automated start/shift control. The manual mode M2 is a mode in which the clutch device 26 is controlled by calculating a clutch capacity in accordance with an occupant's clutch operation instruction. The manual intervention mode M3 is a temporary manual operation mode in which the clutch device 26 is controlled by receiving a clutch operation instruction from the occupant during the automated mode M1 and calculating a clutch capacity from the clutch operation instruction. Also, the manual intervention mode is set such that the mode is returned to the automated mode M1 when the occupant stops (completely releases) the operation on the clutch lever 4b during the manual intervention mode M3.

The clutch control device 60A according to the present embodiment generates a clutch control hydraulic pressure by driving an oil pump (not illustrated) using a rotary driving force of the engine 13. Thus, the clutch control device 60A starts control from a clutch off state (a disconnected state) in the automated mode M1 at the time of system startup. Also, because a clutch operation is unnecessary when the engine 13 is stopped, the clutch control device 60A is set to return to the clutch off state in the automated mode M1.

Basically, in the automated mode M1, clutch control is automatically performed and the motorcycle 1 is enabled to travel without any lever operation. In the automated mode M1, a clutch capacity is controlled according to a degree of throttle opening, an engine rotational speed, a vehicle speed, and a shift sensor output. Thereby, the motorcycle 1 can start without an engine failure (engine stop or engine stall) in only a throttle operation and a shift can be performed in only a shift operation. However, at the time of an extremely low speed corresponding to idling, the clutch device 26 may be automatically disconnected. Also, by gripping the clutch lever 4b in the automated mode M1, the mode is switched to the manual intervention mode M3 and the clutch device 26 can be arbitrarily disconnected.

On the other hand, in the manual mode M2, a clutch capacity is controlled according to a lever operation by the occupant. Switching between the automated mode M1 and the manual mode M2 can be performed by operating the clutch control mode changeover switch 59 (see FIG. 4) while the vehicle is stopped. Also, the clutch control device 60A may include an indicator indicating validity of a lever operation at the time of the transition to the manual system M2A (the manual mode M2 or the manual intervention mode M3).

In the manual mode M2, basically, clutch control is manually performed and a clutch hydraulic pressure can be controlled in accordance with an operation angle of the clutch lever 4b. Thereby, the connection and disconnection of the clutch device 26 can be controlled in accordance with the occupant's intention and the vehicle can also travel by the clutch device 26 being connected at the time of an extremely low speed corresponding to idling. However, an engine failure may be caused due to a lever operation and automatic starting in only a throttle operation cannot be performed. Also, clutch control is automatically performed through intervention at the time of a shift operation in the manual mode M2.

Although the connection and disconnection of the clutch device 26 are automatically performed by the clutch actuator 50 in the automated mode M1, a manual operation can be temporarily performed through intervention in the automated control of the clutch device 26 when a manual clutch operation is performed on the clutch lever 4b (the manual intervention mode M3).

Figure 6:
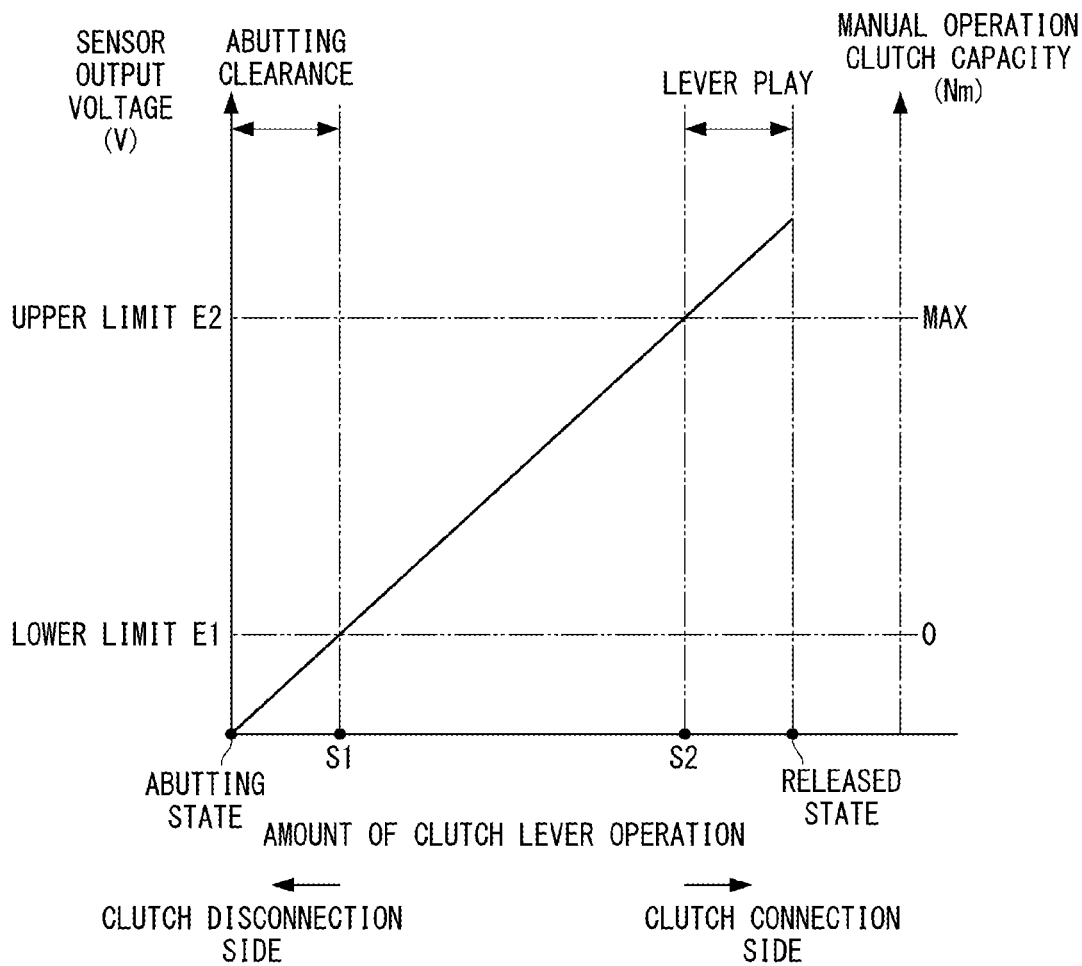
FIG. 6 is a graph illustrating correlations between an amount of clutch lever operation, a sensor output voltage, and a clutch capacity according to the embodiment of the present invention.

As illustrated in FIG. 6, an amount of operation (a rotation angle) of the clutch lever 4b and an output value of a clutch lever operation amount sensor (a clutch operation amount sensor) 4c are in a mutually proportional relation (a correlation). The ECU 60 calculates a target hydraulic pressure of the clutch device 26 on the basis of an output value of the clutch lever operation amount sensor 4c. An actual hydraulic pressure (a slave hydraulic pressure) generated in the slave cylinder 28 follows a target hydraulic pressure delayed by the pressure loss.

<Manual Clutch Operation>

As illustrated in FIG. 1, the clutch lever 4b serving as a manual clutch operating element is attached to a base side (an inner side in the vehicle width direction) of the left grip of the steering handle 4a. The clutch lever 4b has no mechanical connection with the clutch device 26 using a cable, a hydraulic pressure, or the like and functions as an operating element for transmitting a clutch operation request signal to the ECU 60. That is, the motorcycle 1 employs a clutch-by-wire system in which the clutch lever 4b and the clutch device 26 are electrically connected to each other.

Referring also to FIG. 4, the clutch lever operation amount sensor 4c, which detects the amount of operation (the rotation angle) of the clutch lever 4b, is integrally provided in the clutch lever 4b. The clutch lever operation amount sensor 4c converts the amount of operation of the clutch lever 4b into an electrical signal and outputs the electrical signal. In a state in which the operation of the clutch lever 4b is valid (the manual system M2A), the ECU 60 drives the clutch actuator 50 on the basis of an output of the clutch lever operation amount sensor 4c. Also, the clutch lever 4b and the clutch lever operation amount sensor 4c may be formed as an integrated body or separate bodies.

The motorcycle 1 includes the clutch control mode changeover switch 59 that switches between control modes of a clutch operation. The clutch control mode changeover switch 59 can arbitrarily perform switching between the automated mode M1 in which clutch control is automatically performed under a predetermined condition and the manual mode M2 in which clutch control is manually performed in accordance with an operation of the clutch lever 4b. For example, the clutch control mode changeover switch 59 is provided in a handle switch attached to the steering handle 4a. Thereby, the occupant can easily operate the clutch control mode changeover switch 59 at the time of normal driving.

Referring also to FIG. 6, the clutch lever 4b can rotate between a released state in which the clutch lever 4b rotates to a clutch connection side when the clutch lever 4b is released without being gripped by the occupant and an abutting state in which the clutch lever 4b rotates to a grip side (a clutch disconnection side) and abuts against the grip in accordance with the gripping of the occupant. When the gripping operation of the occupant is released, the clutch lever 4b is biased to return to the released state that is an initial position.

For example, the clutch lever operation amount sensor 4c may be configured such that an output voltage is set to zero in a state in which the clutch lever 4b is completely gripped (the abutting state) and the output voltage is increased in accordance with a release operation (an operation toward the clutch connection side) of the clutch lever 4b from that state. In the present embodiment, a range in which a voltage for a lever play part present at the start of the gripping of the clutch lever 4b and a voltage for an abutting clearance for securing a gap of a degree at which a finger enters between the gripped lever and the grip among output voltages of the clutch lever operation amount sensor 4c are excluded is set to a range of valid voltages (a valid operation range of the clutch lever 4b).

Specifically, a range between an amount of operation S1 when the clutch lever 4b is released by an amount corresponding to the abutting clearance from the state in which the clutch lever 4b abuts and an amount of operation S2 when the clutch lever 4b is released until an amount corresponding to the lever play part starts is set in correspondence with a range from a lower limit value E1 to an upper limit value E2 of the valid voltage. This range from the lower limit value E1 to the upper limit value E2 corresponds to a range from zero to MAX of the calculated value of a manually operated clutch capacity in a proportional relation. Thereby, influences of a mechanical backlash, a sensor variation, and the like are reduced and the reliability of an amount of driving of the clutch requested by a manual operation can be improved. Also, a voltage at the time of the amount of operation S1 of the clutch lever 4b may be set as the upper limit value E2 of the valid voltage and a voltage at the time of the amount of operation S2 may be set as the lower limit value E1.

<Racing Start Preload Control>

Next, racing start preload control of the motorcycle 1 will be described.

Figure 8:
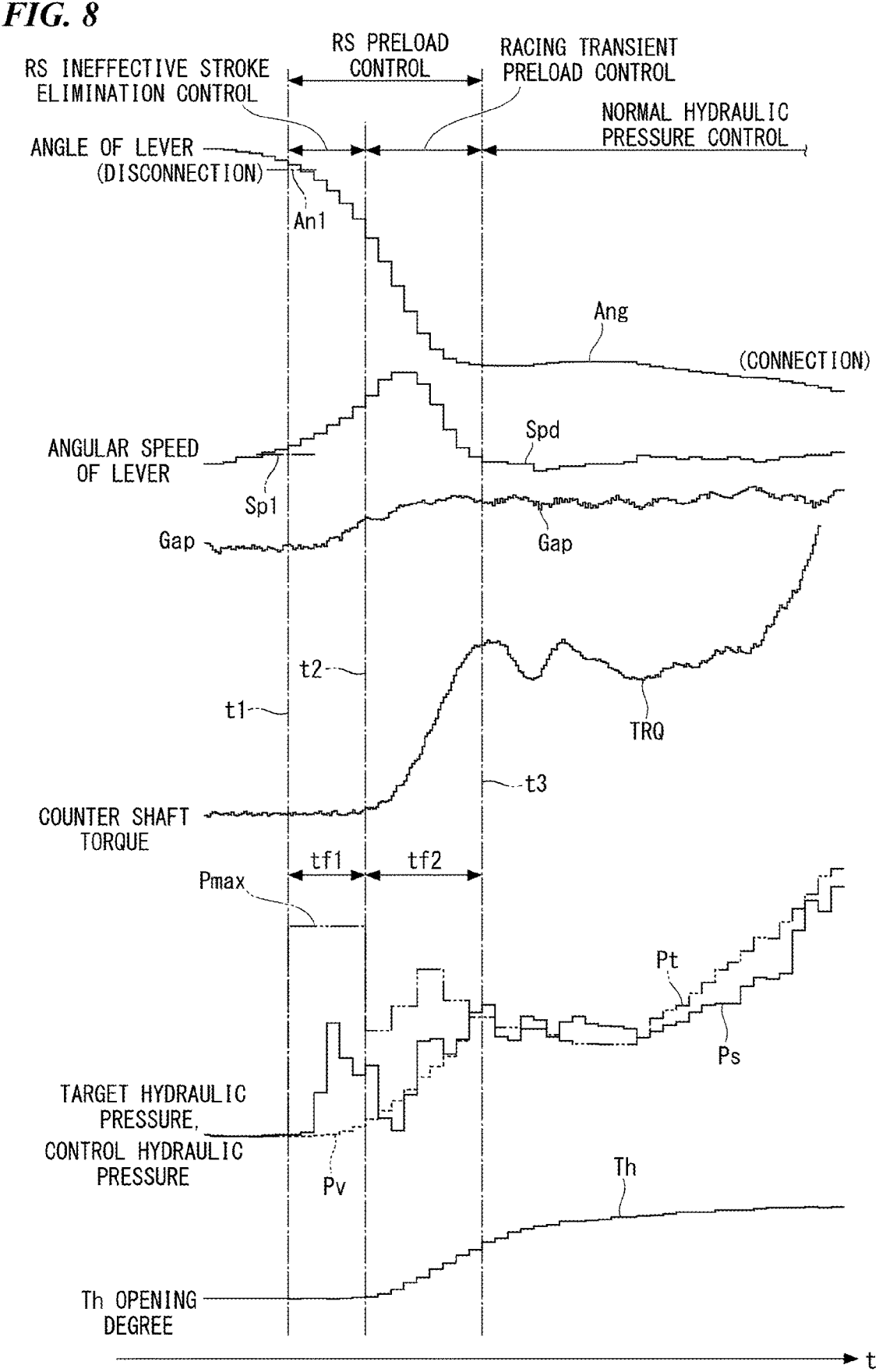
FIG. 8 is a time chart illustrating changes over time in control parameters in a clutch control device according to the embodiment of the present invention.

Referring to FIG. 8, the clutch control device 60A of the present embodiment performs the racing start preload control under predetermined conditions. The "racing start (RS)" causes a control hydraulic pressure (a slave hydraulic pressure or a control parameter) Ps to quickly reach a clutch capacity of a torque control area L to be described below and causes a maximum torque to be generated so that the maximum torque can be controlled. The above-described maximum torque is a maximum torque that does not cause the vehicle body to do a wheelie and does not cause the tires to slip. The start of racing is required to have hydraulic followability at the fastest operation in a transient state when the vehicle starts.

Figure 9:
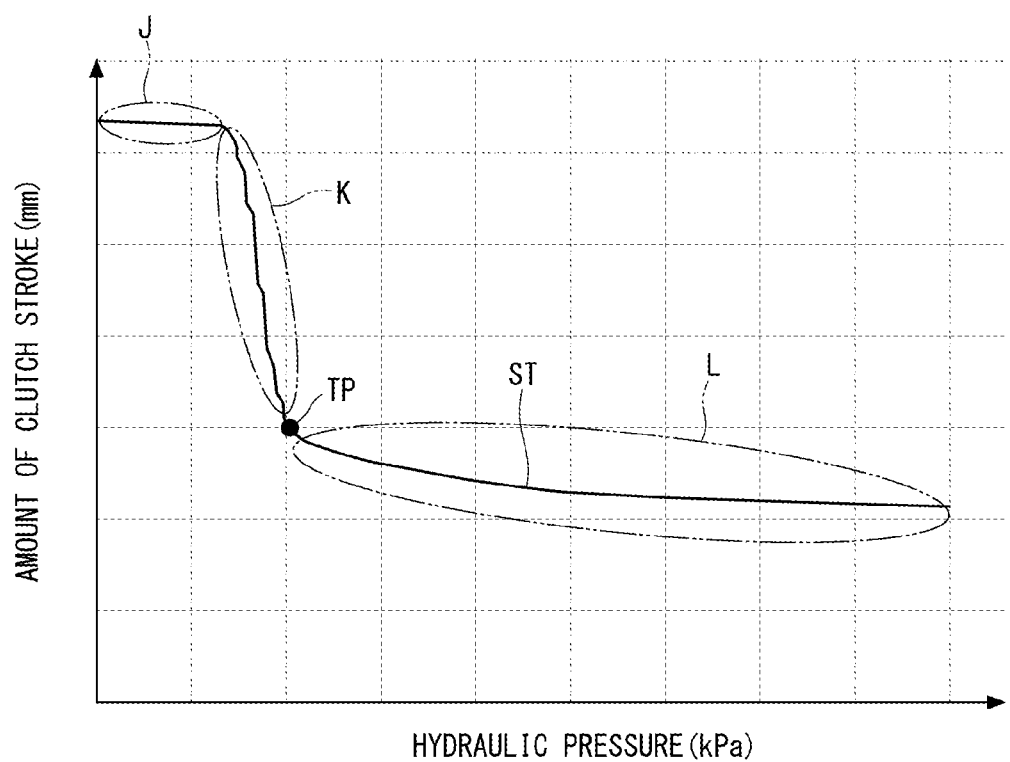
FIG. 9 is a graph illustrating a correlation between an amount of clutch stroke and a hydraulic pressure in the clutch control device according to the embodiment of the present invention.

Referring also to FIG. 9, an operation (an amount of clutch stroke) ST when the clutch device 26 starts is classified into a stationary area J, a stroke area K, and the torque control area L in accordance with a hydraulic pressure that has been assigned. The stationary area J is an area in which the clutch device 26 is in a stationary state before the operation. The stroke area K is an area in which the clutch device 26 is in operation for ineffective stroke elimination (during the stroke). The ineffective stroke elimination is the gap filling until the hydraulic pressure reaches the touch point hydraulic pressure TP. In the stroke area K, it is necessary to control the stroke in a narrow hydraulic pressure range.

The torque control area L is an area in which the clutch device 26 is controlling a transmission load (a clutch capacity) after the touch point hydraulic pressure TP is reached. In the torque control area L, because there is substantially no amount of stroke, a change in the hydraulic pressure is large with respect to the stroke area K. A correlation between the stroke and the hydraulic pressure in the clutch device 26 is significantly different before and after the touch point hydraulic pressure TP in terms of characteristics.

The following two issues in the start of racing can be mentioned. The first issue is to shorten a time period for performing ineffective stroke elimination of the clutch device 26 (gap filling to the touch point hydraulic pressure TP) and the second issue is to enable the clutch transmission load (torque) in the torque control area L to be controlled without follow-up delay or overshooting.

To cope with the first issue, ineffective stroke elimination control for starting racing is provided. The ineffective stroke elimination control for starting racing starts from an early stage of the start of movement in a connection operation on the clutch lever 4b. The ineffective stroke elimination control for starting racing causes a high hydraulic pressure preload to be generated at an early stage of an operation on the lever and shortens an ineffective stroke elimination time period of the clutch device 26.

Figure 14:
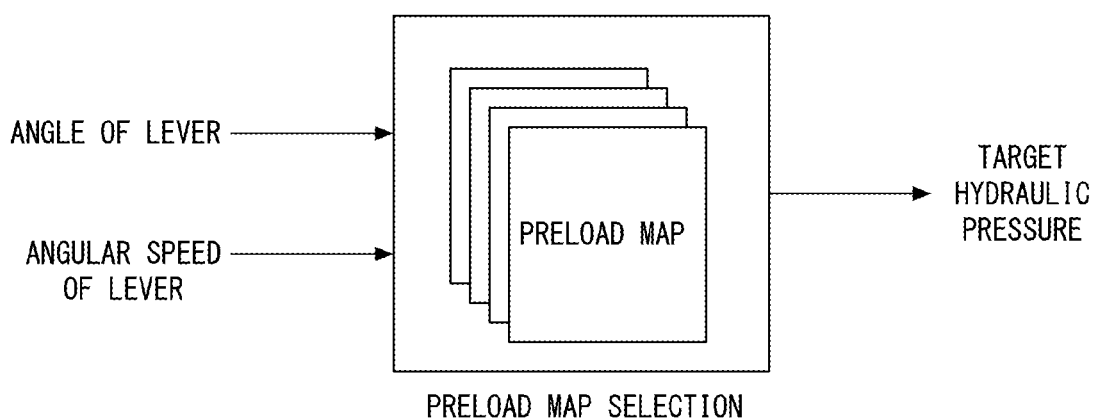
FIG. 14 is an explanatory diagram illustrating a concept of preload map control in the clutch control device according to the embodiment of the present invention.

To cope with the second issue, racing transient preload control is provided. In the racing transient preload control, a plurality of transient preload maps corresponding to a connection operation speed Spd of the clutch lever 4b (see FIG. 14) are set and a natural return from the ineffective stroke elimination control for starting racing to the normal hydraulic pressure control is enabled.

The racing start preload control is configured to include the ineffective stroke elimination control for starting racing and the racing transient preload control.

Execution conditions for the racing start preload control include the following three conditions. That is, the three conditions include the first condition in which the engine rotational speed is high, the second condition in which an angle of the clutch lever 4b is a shallow angle on a grip side (a clutch disconnection side), and the third condition in which an operation on the clutch lever 4b is a fast release operation (a clutch connection operation). At the start of racing, when the clutch lever 4b is quickly released at a high engine rotational speed to cause the clutch to be in an engaged state, the racing start preload control is performed. Thereby, a high hydraulic pressure is generated in the clutch actuator 50 and a control target value (a target hydraulic pressure or a target value) Pt of the clutch capacity is increased.

For example, at the start of racing, the clutch actuator 50 is driven with upper limit capability to generate a higher hydraulic pressure than usual. Thereby, it is possible to connect the clutch device 26 as quickly as possible (maximize a speed of the stroke). Hereinafter, the target hydraulic pressure at the start of racing may be referred to as a "maximum value."

In the racing start preload control, when the connection operation speed Spd of the clutch lever 4b is fast, the above-described target hydraulic pressure Pt is set to a quick connection target hydraulic pressure (the above-described maximum value) higher than an operation correspondence target hydraulic pressure (an operation correspondence target value) Pv according to an amount of operation on the clutch lever 4b. The above-described target hydraulic pressure increases and therefore the clutch device 26 is operated on the connection side. In the racing start preload control, the ineffective stroke eliminating hydraulic pressure for starting racing (the quick connection target value) Pmax is set as the above-described quick connection target hydraulic pressure.

Figure 11:
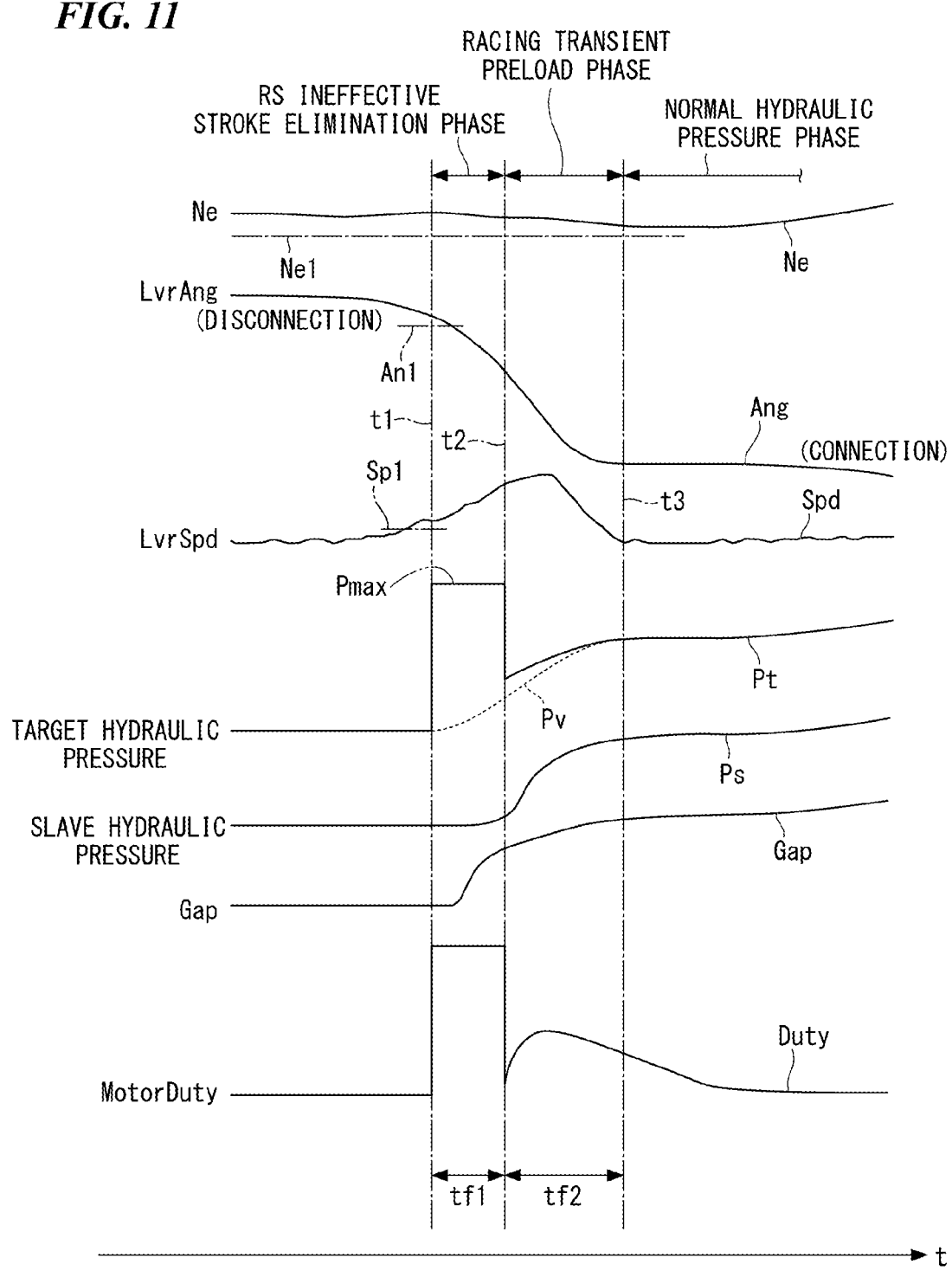
FIG. 11 is a time chart illustrating a simplified change over time in a control parameter in the clutch control device according to the embodiment of the present invention.

Referring to FIGS. 8 and 11, a control phase (Phase) at the start of racing is switched in the order of an ineffective stroke elimination phase for starting racing, a racing transient preload phase, and a normal hydraulic pressure phase.

Referring also to FIG. 9, the clutch device 26 is within the stroke area L before the start of racing. Immediately after the start of racing, the clutch device 26 changes the stroke area K to the torque control area L side due to the ineffective stroke elimination phase for starting racing. Subsequently, the clutch device 26 passes through the racing transient preload phase and then changes to the torque control area L due to the normal hydraulic pressure phase.

In the drawings, a line Spd indicates a speed of an operation on the clutch lever 4b (an angular speed), a line Ang indicates an angle of the operation on the clutch lever 4b, a line Gap indicates a gap of the clutch device 26 (corresponding to an amount of stroke), a line TRQ indicates a counter shaft torque, a line Pt indicates a target hydraulic pressure, a line Pv indicates an operation correspondence target hydraulic pressure according to the angle of the operation on the clutch lever 4b at the target hydraulic pressure, a line Ps indicates a slave hydraulic pressure (a control hydraulic pressure), a line Ne indicates an engine rotational speed, a line Th indicates a degree of throttle opening, and a line Duty indicates a motor duty ratio (Motor Duty) (corresponding to an amount of electric power supplied to the clutch actuator 50).

Figure 13:
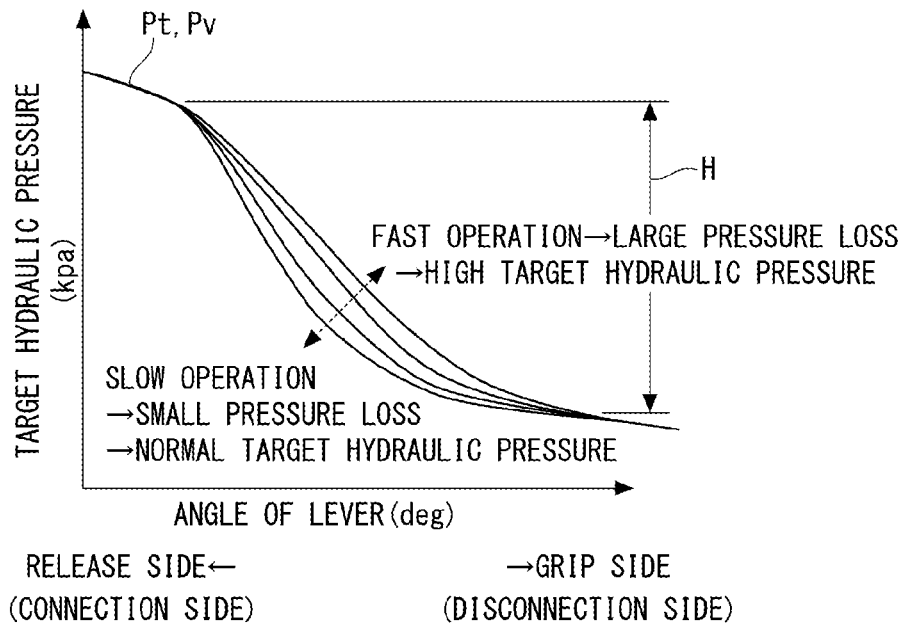
FIG. 13 is a graph illustrating a correlation between a target hydraulic pressure and an angle of a lever in the clutch control device according to the embodiment of the present invention.

Also, in the graph shown in FIG. 13, the vertical axis represents a target hydraulic pressure for clutch control and the horizontal axis represents an angle of the lever (an angle of an operation on the clutch lever 4b). When the clutch lever 4b is at the angle of the lever on the release side, the target hydraulic pressure Pt increases and the clutch device 26 is in the connected state. When the clutch lever 4b is at the angle of the lever on the grip side, the target hydraulic pressure Pt decreases and the clutch device 26 is in the disconnected state.

A range H of the target hydraulic pressure in FIG. 13 is a range in which the clutch device 26 is in a half-clutch state in which a part of motive power of the entire capacity can be transmitted. This range H corresponds to a range until the hydraulic pressure on the slave cylinder 28 side (a downstream side) detected by the downstream-side hydraulic pressure sensor 58 reaches a hydraulic pressure at which the clutch device 26 is completely engaged (the clutch gap becomes 0) with an increase to the touch point hydraulic pressure TP or higher. Within this range H, a method of changing the target hydraulic pressure Pt (the operation correspondence target hydraulic pressure Pv) changes in accordance with the speed of the operation on the lever.

Referring to FIGS. 8, 11, 13, and 14, the ECU 60 calculates the angle of the lever and the speed of the operation on the lever at specified control intervals. The ECU 60 includes a plurality of preload maps according to the speed of the operation on the lever. The ECU 60 selectively selects a preload map in accordance with the speed of the operation on the lever when the angle of the lever has reached a predetermined specified angle (for example, a racing start allowable angle An1 to be described below) and causes a correlation between the target hydraulic pressure and the angle of the lever to be changed. In the preload map of a high-speed side, a target hydraulic pressure for the angle of the lever higher than that in the preload map on a low-speed side is set (see FIG. 13). Thereby, an influence of pressure loss during a fast lever operation is reduced and the follow-up delay of the slave hydraulic pressure with respect to the target hydraulic pressure is restricted. That is, the responsiveness of the slave hydraulic pressure is also ensured at the time of the fast lever operation.

Incidentally, when the start of racing is made in the fast lever operation, an intervention timing of the ineffective stroke elimination control for starting racing is advanced. At the time of a return from the ineffective stroke elimination control for starting racing to the normal hydraulic pressure control, a difference in the control hydraulic pressure at the time of the return to the normal hydraulic pressure control is reduced by increasing the target hydraulic pressure according to the preload map on the high-speed side.

When the target hydraulic pressure is increased to the maximum value through the ineffective stroke elimination control for starting racing and then decreased to the preload map on the low-speed side corresponding to the normal hydraulic pressure control, a difference in the control hydraulic pressure (the slave hydraulic pressure) is large and follow-up delay and overshooting of the slave hydraulic pressure are likely to occur. On the other hand, it is possible to reduce the difference in the control hydraulic pressure after the ineffective stroke elimination control for starting racing and stabilize the clutch connection by increasing the target hydraulic pressure and the control hydraulic pressure according to the preload map on the high-speed side. That is, the preload map control after the ineffective stroke elimination control for starting racing corresponds to the racing transient preload control.

<Control Flow>

Figure 10:
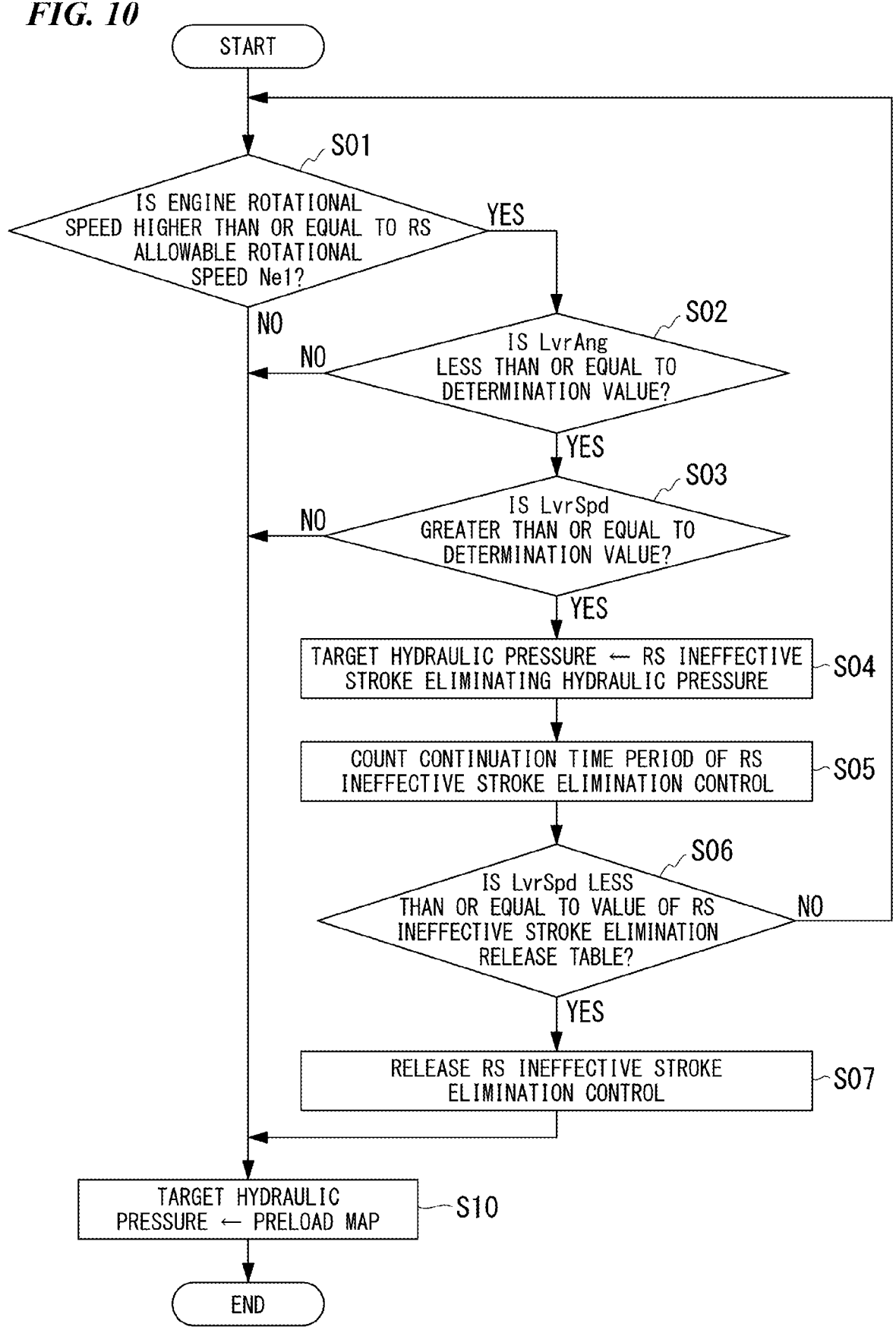
FIG. 10 is a flowchart illustrating a control flow in the clutch control device according to the embodiment of the present invention.

Next, an example of a process executed by the ECU 60 when the vehicle starts will be described with reference to the flowchart of FIG. 10. This control flow is iteratively executed at specified control intervals (1 to 10 msec).

First, the ECU 60 determines whether or not the engine rotational speed is higher than or equal to the racing start allowable rotational speed (the specified rotational speed) Ne1 (see FIG. 11) before the vehicle starts and when the clutch is disconnected (step S01). In the case of NO (when the engine rotational speed is less than the racing start allowable rotational speed Ne1) in step S01, the process proceeds to step S10 and the preload map control serving as the normal hydraulic pressure control is performed. In this preload map control, after a preload map is selected in accordance with the speed of the operation on the lever, the target hydraulic pressure according to the angle of the lever (the operation correspondence target hydraulic pressure) is calculated on the basis of the selected preload map.

In the case of YES (when the engine rotational speed is higher than or equal to the racing start allowable rotational speed Ne1) in step S01, the process proceeds to step S02 and it is determined whether or not an angle LvrAng of the operation on the clutch lever 4b to the connection side is less than or equal to a determination value (whether or not the angle of the lever is at a shallow angle on the disconnection side). The determination value at this time is designated as the racing start allowable angle An1 (see FIGS. 8 and 11). In the case of YES (when the angle LvrAng of the operation on the clutch lever 4b is less than or equal to the determination value) in step S02, the process proceeds to step S03. In the case of NO (when the angle LvrAng of the operation on the clutch lever 4b exceeds the determination value) in step S02, the process proceeds to step S10 and the preload map control serving as the normal hydraulic pressure control is performed.

In step S03, it is determined whether or not a speed LvrSpd of the operation on the clutch lever 4b to the connecting side is greater than or equal to the determination value. At this time, the determination value is designated as the racing start allowable speed (the specified speed) Sp1 (see FIGS. 8 and 11). In the case of YES (when the speed LvrSpd of the operation on the clutch lever 4b is greater than or equal to the determination value) in step S03, the process proceeds to step S04. In the case of NO (when the speed LvrSpd of the operation on the clutch lever 4b is less than the determination value) in step S03, the process proceeds to step S10 and the preload map control serving as the normal hydraulic pressure control is performed.

In step S04, as the ineffective stroke elimination control for starting racing, the target value of the slave hydraulic pressure is set to the maximum value (the ineffective stroke eliminating hydraulic pressure Pmax for starting racing) regardless of the amount of operation on the clutch lever 4b.

That is, the engine rotational speed is higher than or equal to a predetermined speed before the vehicle starts and at the time of the disconnection of the clutch and the ineffective stroke elimination control for starting racing is performed when a fast connection operation is performed when the clutch lever 4b is at a shallow operation angle. A start timing of the ineffective stroke elimination control for starting racing is denoted by a reference sign t1 in FIGS. 8 and 11.

Figure 12:
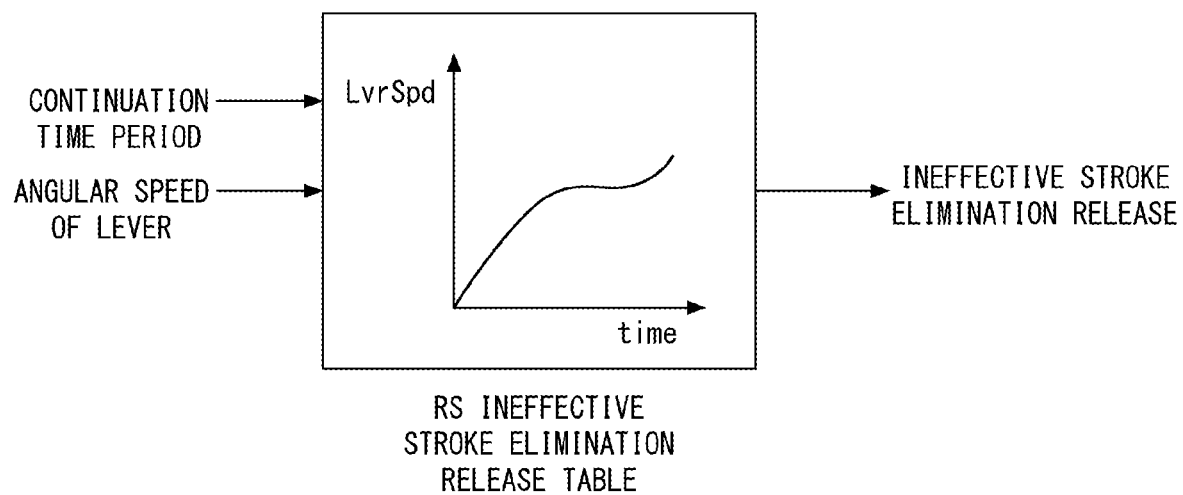
FIG. 12 is an explanatory diagram illustrating a concept when an ineffective stroke elimination continuation time period is set in the clutch control device according to the embodiment of the present invention.

Also, in step S05, a continuation time period (an ineffective stroke elimination time period) tf1 of the ineffective stroke elimination control for starting racing is counted. The continuation time period tf1 is, for example, about 25 msec, and is set on the basis of the RS ineffective stroke elimination release table shown in FIG. 12. The RS ineffective stroke elimination release table shows a correlation between a speed of the operation on the clutch lever 4b (an angular speed of the lever) and the continuation time period tf1. The continuation time period tf1 is generally set to be longer when the speed of the operation on the clutch lever 4b is faster.

Next, the process proceeds to step S06, the angular speed of the lever with respect to the continuation time period tf1 counted in step S05 is compared with a value of the RS ineffective stroke elimination release table, and it is determined whether or not the angular speed of the lever is less than or equal to the value of the RS ineffective stroke elimination release table. In the case of YES (when the angular speed of the lever is less than or equal to the value in the RS ineffective stroke elimination release table) in step S06, the process proceeds to step S07 and the ineffective stroke elimination control for starting racing is released. In the case of NO (when the angular speed of the lever exceeds the value in the RS ineffective stroke elimination release table) in step S06, the process from step S01 is iterated. A release (end) timing of the ineffective stroke elimination control for starting racing is denoted by a reference sign t2 in FIGS. 8 and 11.

Subsequently, from step S10, the process is shifted to the preload map control serving as the racing transient preload control. A second continuation time period (a transient preload time period) tf2, which is the continuation time period of the preload map control serving as the racing transient preload control, is, for example, about 50 msec. The release (end) timing of the racing transient preload control is denoted by a reference sign t3 in FIGS. 8 and 11.
<Control Supplement>

Referring to FIG. 11, when a fast lever operation has been performed, the ECU 60 advances a timing (an ineffective stroke elimination start timing) t1 for raising the target hydraulic pressure in the ineffective stroke elimination control for starting racing. When the ECU 60 predicts that the rider intends to start racing, the ECU 60 sets the target hydraulic pressure to a maximum value.

The conditions for predicting that the rider intends to start racing include the following three conditions. That is, the three conditions include the first condition in which the engine rotational speed is high when the vehicle starts (the engine rotational speed is higher than or equal to the racing start allowable rotational speed Ne1), the second condition in which the angle of the operation on the clutch lever 4b to the connection side is shallow (or is less than or equal to a determination value), and the third condition in which the speed of the operation on the clutch lever 4b to the connection side is high (or is greater than or equal to a determination value).

The ECU 60 predicts that the rider intends to start racing at the timing t1 when the above-described conditions are satisfied and sets the target hydraulic pressure to the maximum value. The ECU 60 sets the target hydraulic pressure to the maximum value for the specified time period tf1 set on the basis of the RS ineffective stroke elimination release table shown in FIG. 12 from the ineffective stroke elimination start timing t1.

The ECU 60 releases the ineffective stroke elimination control for starting racing at the timing (the ineffective stroke elimination release timing) t2 when the specified time period tf1 has elapsed from the ineffective stroke elimination start timing t1 and is shifted to the racing transient preload. The ineffective stroke elimination release timing t2 is also a transient preload start timing. When the ineffective stroke elimination control for starting racing is released, the ECU 60 decreases the target hydraulic pressure Pt toward the operation correspondence target hydraulic pressure Pv. At this time, because the target hydraulic pressure is raised according to the preload map on the high-speed side, a difference in the control hydraulic pressure is reduced and the clutch connection is stabilized. At the timing (the transient preload release timing) t3 when the predetermined second specified time period tf2 has elapsed from the ineffective stroke elimination release timing t2, the target hydraulic pressure Pt generally coincides with the operation correspondence target hydraulic pressure Pv.

In the clutch control device 60A, at the time when the clutch is quickly connected such as the time of the start of racing, the ineffective stroke elimination at the early stage with respect to the clutch gap and the rise of the slave hydraulic pressure at the early stage are implemented through the ineffective stroke elimination control for starting racing. Also, a stable return to the normal hydraulic pressure control is also implemented through the racing transient hydraulic control at the time of a return to the normal hydraulic pressure control. In this manner, it is possible to improve the operability of the clutch device 26 at the time of a quick clutch connection such as the time of the start of racing.

As described above, according to the above-described embodiment, the clutch control device 60A includes the engine 13; the transmission 21; the clutch device 26 configured to connect and disconnect motive power transmission between the engine 13 and the transmission 21; the clutch actuator 50 configured to drive the clutch device 26 and change a clutch capacity; the clutch lever 4b configured to enable the clutch device 26 to be manually operated; and the ECU 60 configured to calculate a target value (the target hydraulic pressure Pt) of a control parameter (the slave hydraulic pressure Ps) of the clutch capacity in accordance with an amount of operation on the clutch lever 4b. When the clutch device 26 is operated such that it moves to a connection side according to an operation on the clutch lever 4b, the ECU 60 sets the target value to the ineffective stroke eliminating hydraulic pressure Pmax for starting racing obtained by making a change to the connection side of the clutch device 26 with respect to the operation correspondence target hydraulic pressure Pv according to the amount of operation on the clutch lever 4b if a speed of the operation on the clutch lever 4b is higher than or equal to a predetermined specified speed (the racing start allowable speed Sp1).

According to this configuration, when the speed of the operation on the clutch lever 4b is higher than or equal to a predetermined speed, a time period required for the connection preparation (ineffective stroke elimination) of the clutch device is limited by changing the control target value of the clutch capacity to the clutch connection side and making a shift to a quick clutch connection mode using a control target value regardless of the amount of operation on the clutch lever 4b. Thereby, the operability at the time of a quick connection of the clutch device 26 such as the time of the start of racing can be improved.

In the clutch control device 60A, a quick clutch connection mode in which the target value is set to the ineffective stroke eliminating hydraulic pressure Pmax for starting racing continues for the predetermined specified time period tf1.

According to this configuration, it is possible to reliably perform the connection preparation (the ineffective stroke elimination) of the clutch device by causing the quick clutch connection mode in which the control target value of the clutch capacity is changed to the clutch connection side to be continued for a specified time period or longer.

In the clutch control device 60A, the specified time period tf1 changes with the speed of the operation on the clutch lever 4b.

According to this configuration, the continuation time period tf1 of the quick clutch connection mode is increased or decreased in accordance with the speed of the operation on the clutch lever 4b, so that it is possible to adjust timings of the start and release of the quick clutch connection mode in accordance with the speed of the operation on the clutch lever 4b.

In the clutch control device 60A, the quick clutch connection mode is released when the specified time period tf1 has elapsed.

According to this configuration, after the control target value of the clutch capacity is changed with the ineffective stroke eliminating hydraulic pressure Pmax for starting racing, it is possible to operate the clutch in consideration of the intention of the rider by returning to the normal hydraulic pressure control according to the amount of operation on the clutch lever 4b.

In the clutch control device 60A, when a rotational speed of the engine 13 is higher than or equal to a predetermined specified rotational speed (the racing start allowable rotational speed Ne1), the target value is set to the ineffective stroke eliminating hydraulic pressure Pmax for starting racing.

According to this configuration, it is possible to reliably increase the control target value at the time of a quick clutch connection by predicting the rider's intention of the quick clutch connection using the engine rotational speed.

In the clutch control device 60A, the ineffective stroke eliminating hydraulic pressure Pmax for starting racing is the target value when the clutch actuator 50 is driven at an upper limit.

According to this configuration, it is possible to improve the responsiveness of the clutch device 26 as much as possible by increasing the ineffective stroke eliminating hydraulic pressure Pmax for starting racing at a maximum value in the performance of the clutch actuator 50.

<Application Examples>

Hereinafter, an example when the quick clutch connection mode in which control similar to the racing start preload control is performed is executed at the time of a reconnection when the clutch device 26 is disconnected in the shift operation or the like instead of the time of the start of racing will be described. Also, the components which are the same as those in the above-described embodiment are denoted by the same reference signs and detailed description thereof will be omitted.

Figure 15:
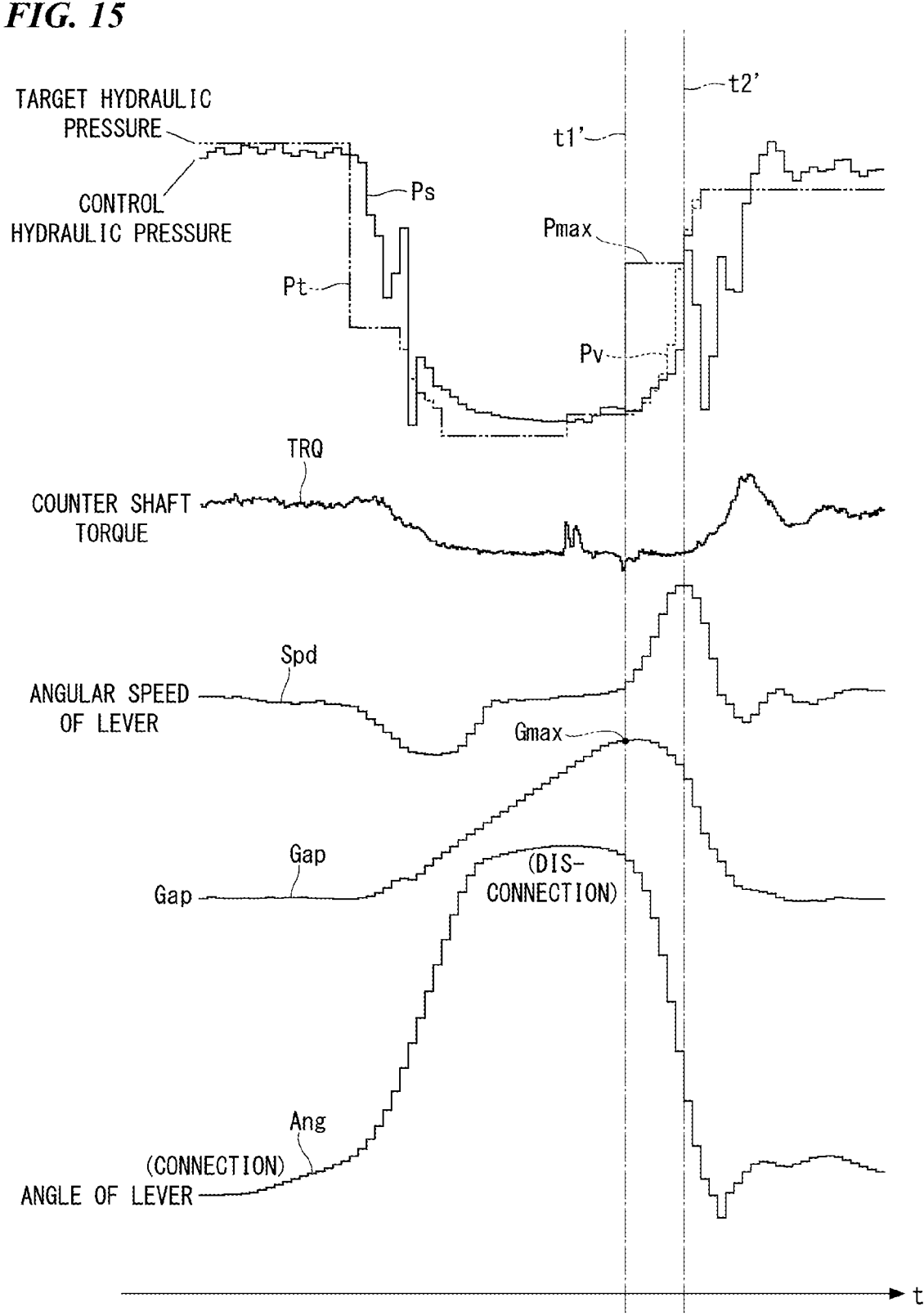
FIG. 15 is a time chart corresponding to FIG. 8 illustrating an application example of the clutch control device according to the embodiment of the present invention.

FIG. 15 illustrates a change over time in the control parameter when the quick clutch connection mode is executed at the time of the reconnection. When it is predicted that the rider intends to perform a fast shift operation (including a clutch connection operation), the ECU 60 sets the target hydraulic pressure to the maximum value (the ineffective stroke eliminating hydraulic pressure Pmax for starting racing).

The conditions for predicting that the rider intends to perform a fast shift operation include the following three conditions as in the conditions for predicting the intention to start racing. That is, the three conditions include the first condition in which the engine rotational speed is high (or is higher than or equal to a predetermined specified rotational speed), the second condition in which the angle of the operation on the clutch lever 4b to the connection side is shallow (or is less than or equal to a determination value), and the third condition in which the speed of the operation on the clutch lever 4b to the connection side is high (or is greater than or equal to a determination value).

The ECU 60 predicts that the rider intends to perform a fast shift operation at a timing (a preload start timing) t1' when the above-described conditions are satisfied and sets the target hydraulic pressure to a maximum value. The ECU 60 sets the target hydraulic pressure to a maximum value for a specified time period set on the basis of a preload release table (not illustrated) from the preload start timing t1'. At the preload start timing t1', the clutch gap reaches a peak value (a maximum value) Gmax. When the operation correspondence target hydraulic pressure Pv has increased to the maximum value before the lapse of the above-described specified time period, the quick clutch connection mode ends at a timing t2' and the target hydraulic pressure Pt is set to the operation correspondence target hydraulic pressure Pv.

In this manner, the ineffective stroke elimination at the early stage with respect to the clutch gap and the rise of the slave hydraulic pressure at the early stage are also implemented through the quick clutch connection mode at the time of the fast shift operation. Thereby, it is also possible to improve the operability of the clutch device 26 at the time of a quick clutch connection such as at the time of the fast shift operation.

Figure 16:
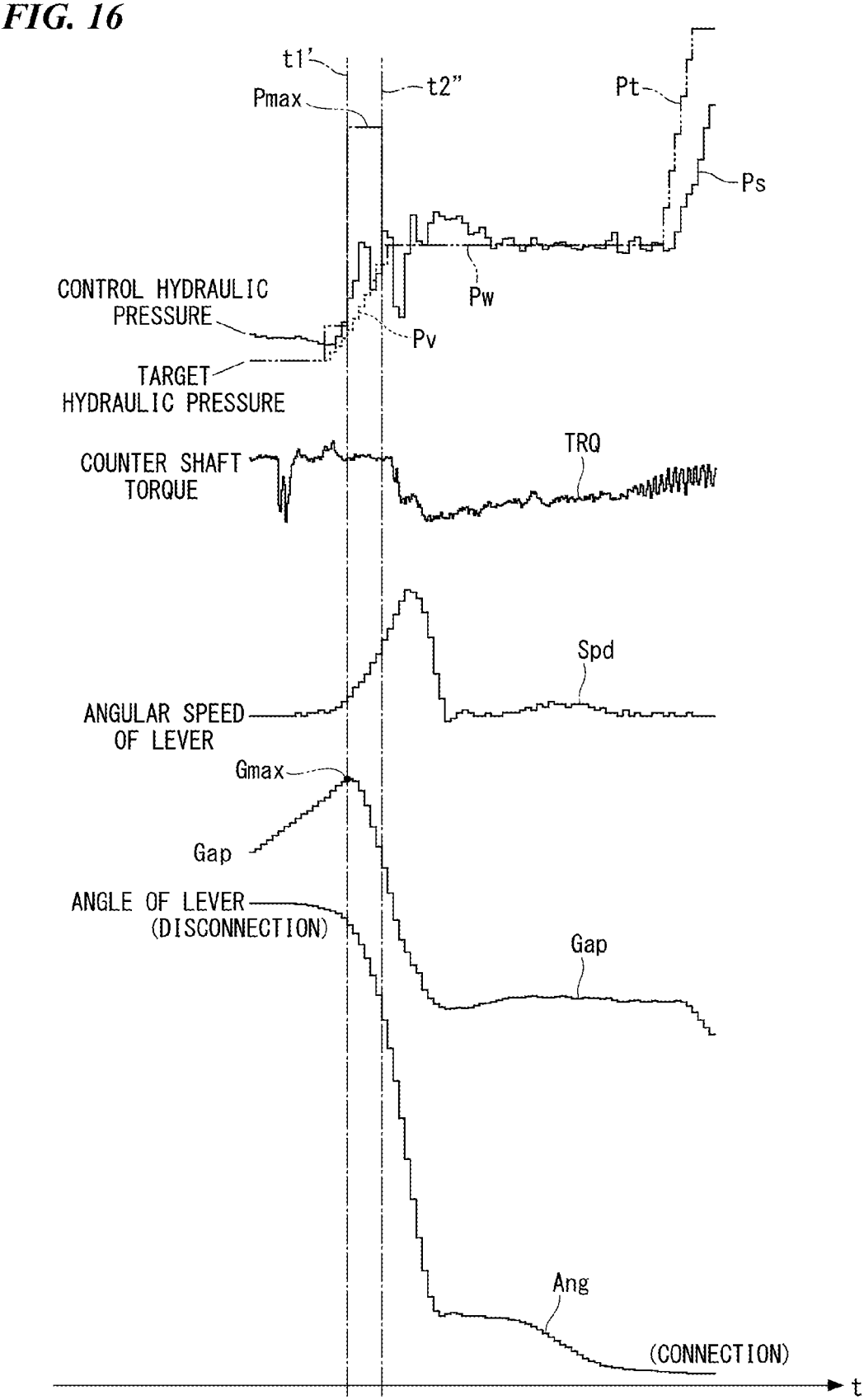
FIG. 16 is a time chart corresponding to FIG. 8 illustrating another application example of the clutch control device according to the embodiment of the present invention.

FIG. 16 illustrates a change over time in the control parameter when slip control intervenes at the time of the reconnection described above. The slip control is control for reducing the clutch capacity when an excessive back torque acts on the clutch device 26 when the vehicle decelerates. Thereby, a back torque acting on the clutch device 26 is released and an excessive engine brake is prevented from being applied to the drive wheels.

The ECU 60 predicts that the rider intends to perform a fast shift operation at the timing t1' when the above-described conditions are satisfied and sets the target hydraulic pressure to the maximum value. Subsequently, when the slip control is performed, before the above-described specified time period elapses, the quick clutch connection mode ends at the timing t2" immediately before the slip control and the target hydraulic pressure is decreased to a value (a slip hydraulic pressure Pw) that causes the slip in the clutch device 26.

The present invention is not limited to the above-described embodiment. For example, the present invention is not limited to the application to a configuration in which the clutch is connected by increasing the hydraulic pressure and the clutch is disconnected by decreasing the hydraulic pressure. The present invention may be applied to a configuration in which the clutch is disconnected by increasing the hydraulic pressure and the clutch is connected by decreasing the hydraulic pressure.

The clutch operating element is not limited to the clutch lever $4b$ and a clutch pedal or various other operating elements may be used as the clutch operating element.

The application is not limited to a saddle-riding type vehicle in which the clutch operation is automated as in the above-described embodiment. The present invention can also be applied to a saddle-riding type vehicle including a so-called clutch operation-less transmission device configured to enable a shift by adjusting a driving force without performing the manual clutch operation under predetermined conditions while a manual clutch operation is basically performed.

Also, the above-described saddle-riding type vehicle includes all vehicles in which the driver rides across the vehicle body and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles and vehicles including an electric motor as a motor.

The configuration in the above-described embodiment is an example of the present invention and various modifications can be made without departing from the spirit of the present invention.

BRIEF DESCRIPTION OF THE REFERENCE SYMBOLS

1: Motorcycle (saddle-riding type vehicle)
$4b$: Clutch lever (clutch operating element)
13: Engine (motor)
21: Transmission
26: Clutch device
50: Clutch actuator
60: ECU (control unit)
60A: Clutch control device
An1: Racing start allowable angle (specified angle)
LvrSpd: Operation speed
Ne1: Racing start allowable rotational speed (specified rotational speed)
Pmax: Ineffective stroke eliminating hydraulic pressure for starting racing (quick connection target value)
Ps: Slave hydraulic pressure (control parameter)
Pt: Target hydraulic pressure (target value)
Pv: Operation correspondence target hydraulic pressure (operation correspondence target value)
Sp1: Racing start allowable speed (specified speed)
tf1: Specified time period
tf2: Second specified time period

What is claim is:

1. A clutch control device comprising:
an engine;
a transmission;
a clutch device configured to connect and disconnect motive power transmission between the engine and the transmission;
a clutch actuator configured to drive the clutch device and change a clutch capacity;
a clutch operating element configured to enable the clutch device to be manually operated; and
a control unit configured to calculate a target value of a control parameter of the clutch capacity in accordance with an amount of operation on the clutch operating element,
wherein, the clutch device operates on a connection side configured to connect motive power between the engine and the transmission and a disconnection side where no motive power is connected between the engine and the transmission, and when the clutch device is operated on the connection side according to an operation on the clutch operating element, the control unit is configured to set the target value to a quick connection target value obtained by making a change to the connection side of the clutch device with respect to an operation correspondence target value according to the amount of operation on the clutch operating element when a speed of the operation on the clutch operating element is higher than or equal to a predetermined specified speed.

2. The clutch control device according to claim 1, wherein a quick clutch connection mode in which the target value is set to the quick connection target value continues for a predetermined specified time period.

3. The clutch control device according to claim 2, wherein the specified time period changes with the speed of the operation on the clutch operating element.

4. The clutch control device according to claim 2, wherein the quick clutch connection mode is released when the specified time period has elapsed.

5. The clutch control device according to claim 1, wherein, when a rotational speed of the engine is higher than or equal to a predetermined specified rotational speed, the target value is set to the quick connection target value.

6. The clutch control device according to claim 1, wherein the quick connection target value is the target value when the clutch actuator is driven at an upper limit.

* * * * *